US012598129B2

(12) United States Patent
Kamisetty et al.

(10) Patent No.: US 12,598,129 B2
(45) Date of Patent: Apr. 7, 2026

(54) SYSTEMS AND METHODS FOR CONSISTENT CONFIGURATION UPDATE HANDLING IN HIGH AVAILABILITY DEPLOYMENTS USING A GLOBAL CONFIGURATION EPOCH

(71) Applicant: Pensando Systems Inc., Milpitas, CA (US)

(72) Inventors: Sarat Kamisetty, Fremont, CA (US); Venkata Gopi Ravi Kumar Pedaprolu, Sunnyvale, CA (US); Balakrishnan Raman, Fremont, CA (US); Arun Selvarajan, Cupertino, CA (US); Krishna Doddapaneni, Cupertino, CA (US)

(73) Assignee: Pensando Systems Inc., Milpitas, CA (US)

( * ) Notice: Subject to any disclaimer, the term of this patent is extended or adjusted under 35 U.S.C. 154(b) by 313 days.

(21) Appl. No.: 18/362,460

(22) Filed: Jul. 31, 2023

(65) Prior Publication Data

US 2025/0047589 A1     Feb. 6, 2025

(51) Int. Cl.
*H04L 45/02*       (2022.01)
*H04L 45/021*      (2022.01)
*H04L 49/00*       (2022.01)

(52) U.S. Cl.
CPC ........ *H04L 45/021* (2013.01); *H04L 49/3063* (2013.01)

(58) Field of Classification Search
CPC ....... H04L 45/021; H04L 45/38; H04L 45/54; H04L 45/64; H04L 49/3063; H04L 49/309; H04L 49/354; H04L 49/70
See application file for complete search history.

(56) References Cited

U.S. PATENT DOCUMENTS

| | | | | |
|---|---|---|---|---|
| 9,118,571 | B2 * | 8/2015 | Bisht | H04L 41/083 |
| 9,906,443 | B1 * | 2/2018 | Singh | H04L 49/3063 |
| 10,122,627 | B2 * | 11/2018 | Murgia | H04L 45/124 |

(Continued)

OTHER PUBLICATIONS

Garg, P. et al. "NVGRE: Network Virtualization Using Generic Routing Encapsulation", Independent Submission, Request for Comments: 7637, Sep. 2015, 17 pgs.

(Continued)

*Primary Examiner* — Alpus Hsu

(57) ABSTRACT
A networking device in a high availability (HA) configuration processes network flows for a virtual network interface card (VNIC). Network configurations include networking policies governing network packet processing by the networking device. Global epoch values are associated with each network configuration version. The networking device has a control plane, a data plane, and a flow table. The control plane uses the most recent network configuration to produce flow table entries for storage in the flow table. The data plane uses the flow table entries to process network packets. Flow table entries include flow epoch values matching the global epoch value associated with the network configurations used to create the flow entries. Datapath epoch values, VNIC peer epoch values, and VNIC local epoch values are associated with the VNICs and used to ensure consistent flow table entries among the peers in the HA configuration.

21 Claims, 22 Drawing Sheets

2200

Start

2201

Use by a data plane, an encapsulated network packet received from a virtual network interface card (VNIC) to identify a flow table entry.

2202

Update by a control plane, the flow table entry when the flow table entry is out of date, the VNIC has a HA active role for a virtual internet protocol address (VIP) in the encapsulated network packet, and the VIP is bound to the VNIC,
wherein
a packet processing pipeline circuit of a networking device is configured to implement the data plane, and a processor of the networking device is configured to implement the control plane.

Stop

(56) References Cited

U.S. PATENT DOCUMENTS

| | | | |
|---|---|---|---|
| 10,560,400 B2 * | 2/2020 | Hung | H04L 49/3009 |
| 10,721,157 B2 * | 7/2020 | Bisht | H04L 49/3063 |
| 10,764,181 B2 * | 9/2020 | Singh | H04L 69/22 |
| 10,868,757 B2 * | 12/2020 | Santos | H04L 41/0816 |
| 10,931,572 B2 * | 2/2021 | Nallapareddy | H04L 49/70 |
| 2016/0156552 A1 * | 6/2016 | Li | H04L 45/54 |
| | | | 370/392 |
| 2019/0190814 A1 * | 6/2019 | Tseng | H04L 45/021 |
| 2019/0222538 A1 * | 7/2019 | Yang | H04L 49/15 |
| 2019/0334808 A1 * | 10/2019 | Nandy | H04L 45/021 |
| 2020/0044959 A1 * | 2/2020 | Bisht | H04L 45/18 |
| 2020/0236039 A1 * | 7/2020 | Nallapareddy | H04L 49/70 |
| 2022/0045940 A1 * | 2/2022 | Subrahmanya | G06F 16/907 |
| 2022/0045945 A1 * | 2/2022 | Subrahmanya | H04L 45/38 |
| 2022/0377013 A1 * | 11/2022 | Doddapaneni | H04L 45/38 |

OTHER PUBLICATIONS

Mahalingam, M. et al. "Virtual extensible Local Area Network (VXLAN): A Framework for Overlaying Virtualized Layer 2 Networks over Layer 3 Networks", Independent Submission, Request for Comments: 7348, Aug. 2014, 22 pgs.

* cited by examiner

Table Data

Key Data

Start Address

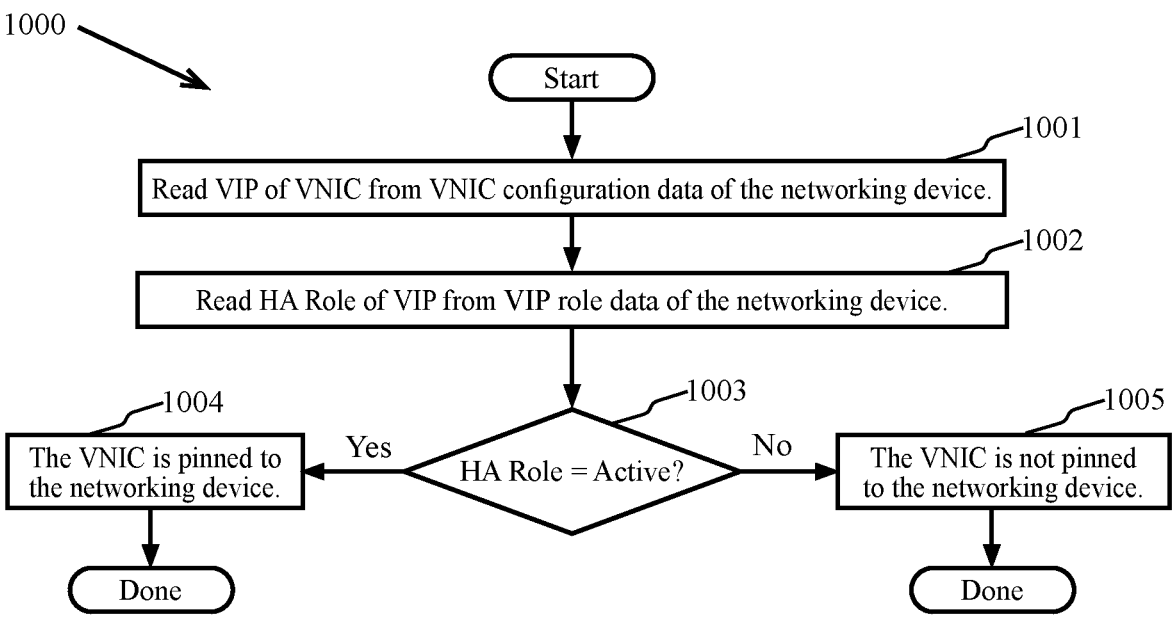

1000

Start

1001
Read VIP of VNIC from VNIC configuration data of the networking device.

1002
Read HA Role of VIP from VIP role data of the networking device.

1003
HA Role = Active?

1004
Yes → The VNIC is pinned to the networking device.

Done

1005
No → The VNIC is not pinned to the networking device.

Done

FIG. 10

| Flow Table Entry | 1101 |
|---|---|
| Network Flow Identifier | 1102 |
| Flow Epoch Value | 1103 |
| Source IP Address | 812 |
| Destination IP Address | 813 |
| Source Port Number | 822 |
| Destination Port Number | 823 |
| Protocol Indicator | 814 |
| Other Network Flow Data | 1109 |
| Connection State (e.g., TCP State) | 1110 |
| VNIC Indicator | 1111 |
| Other State Data | 1112 |

FIG. 11

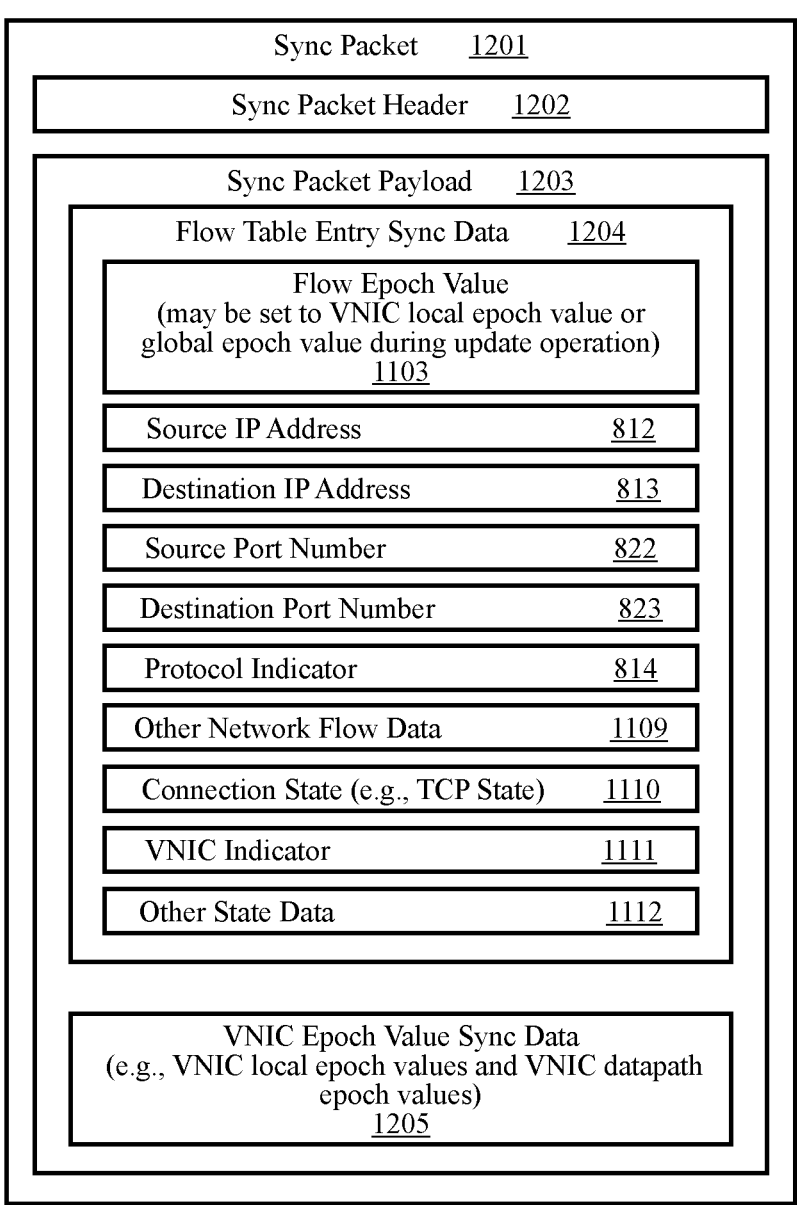

Sync Packet     1201

Sync Packet Header     1202

Sync Packet Payload     1203

Flow Table Entry Sync Data     1204

Flow Epoch Value
(may be set to VNIC local epoch value or
global epoch value during update operation)
1103

Source IP Address                                    812

Destination IP Address                            813

Source Port Number                                822

Destination Port Number                         823

Protocol Indicator                                    814

Other Network Flow Data                        1109

Connection State (e.g., TCP State)          1110

VNIC Indicator                                        1111

Other State Data                                      1112

VNIC Epoch Value Sync Data
(e.g., VNIC local epoch values and VNIC datapath
epoch values)
1205

FIG. 12

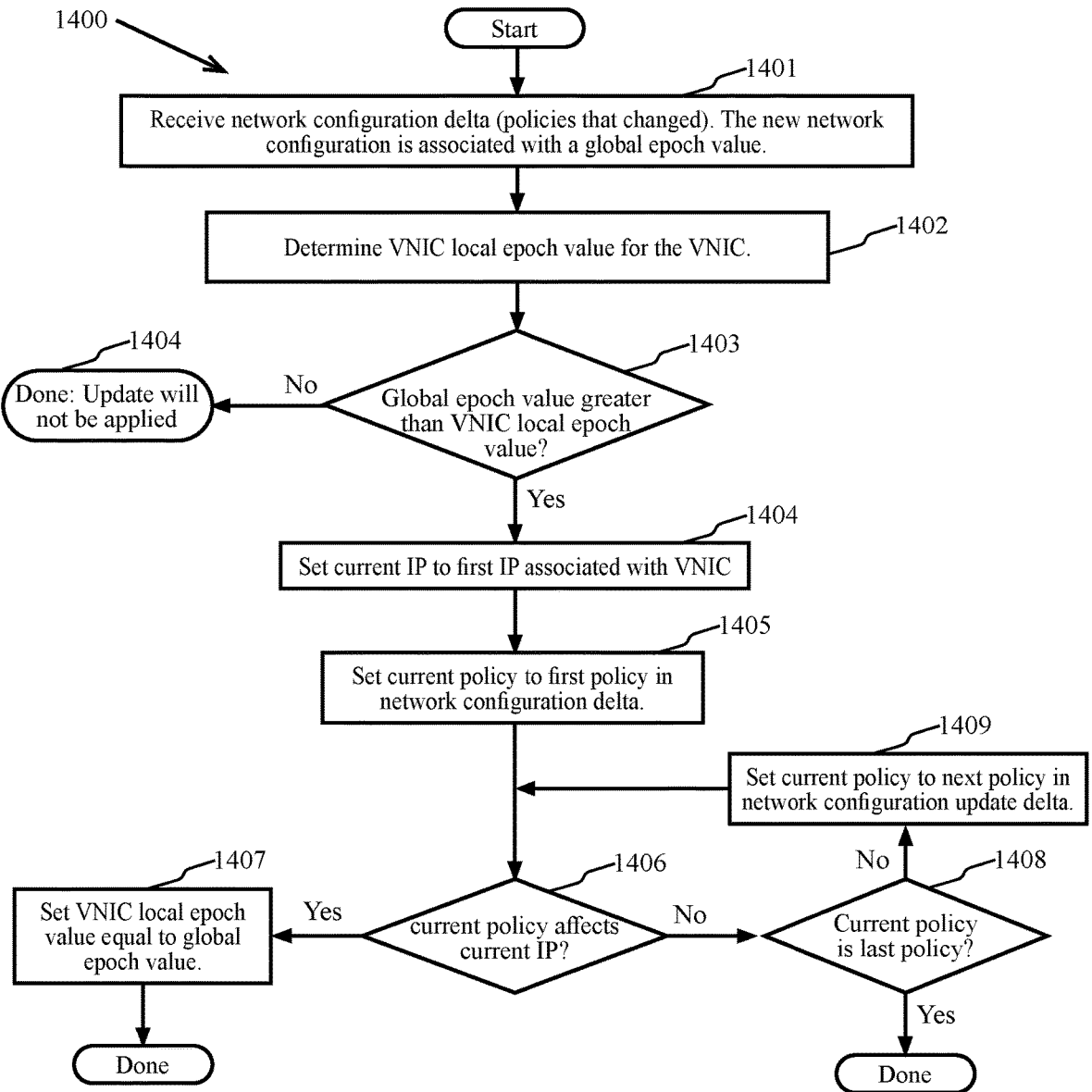

1400

Start

1401
Receive network configuration delta (policies that changed). The new network configuration is associated with a global epoch value.

1402
Determine VNIC local epoch value for the VNIC.

1404
Done: Update will not be applied

No

1403
Global epoch value greater than VNIC local epoch value?

Yes

1404
Set current IP to first IP associated with VNIC

1405
Set current policy to first policy in network configuration delta.

1409
Set current policy to next policy in network configuration update delta.

1407
Set VNIC local epoch value equal to global epoch value.

Yes 1406
current policy affects current IP?

No

No

1408
Current policy is last policy?

Yes

Done

Done

FIG. 14

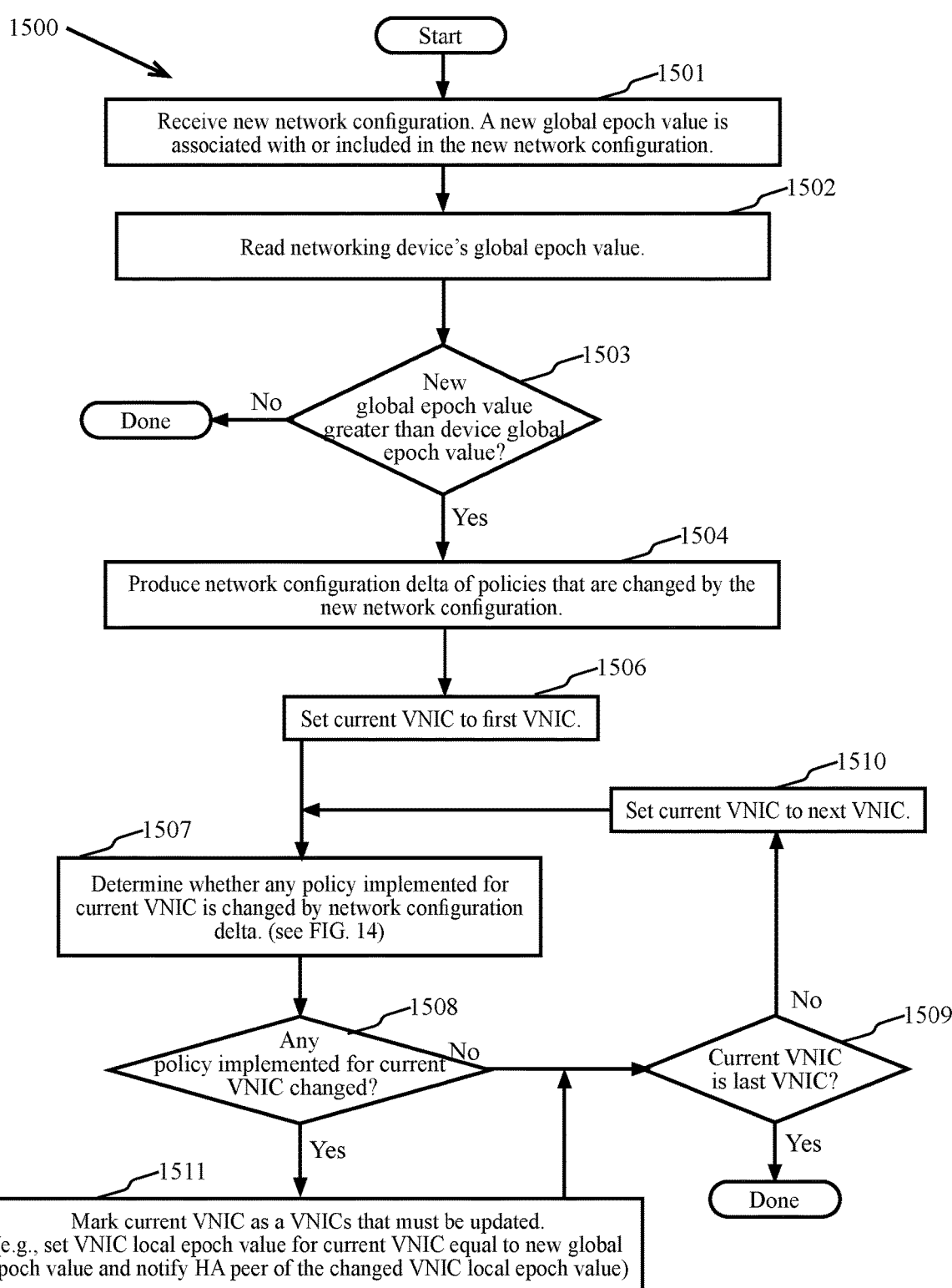

1500

Start

1501

Receive new network configuration. A new global epoch value is associated with or included in the new network configuration.

1502

Read networking device's global epoch value.

1503

New global epoch value greater than device global epoch value?

No → Done

Yes

1504

Produce network configuration delta of policies that are changed by the new network configuration.

1506

Set current VNIC to first VNIC.

1510

Set current VNIC to next VNIC.

1507

Determine whether any policy implemented for current VNIC is changed by network configuration delta. (see FIG. 14)

1508

Any policy implemented for current VNIC changed?

No

1509

Current VNIC is last VNIC?

No

Yes → Done

Yes

1511

Mark current VNIC as a VNICs that must be updated.
(e.g., set VNIC local epoch value for current VNIC equal to new global epoch value and notify HA peer of the changed VNIC local epoch value)

FIG. 15

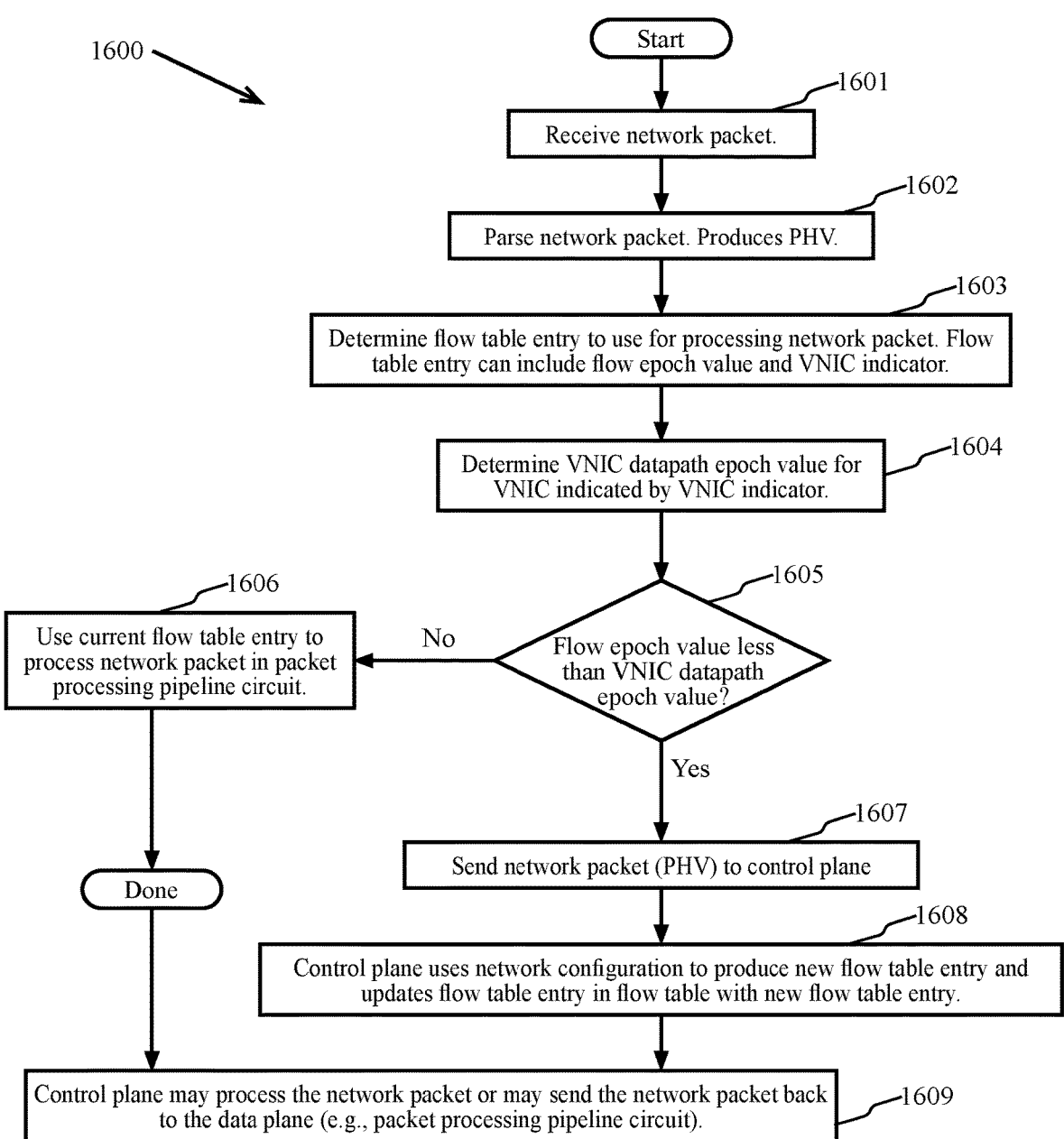

1600

Start

Receive network packet. 1601

Parse network packet. Produces PHV. 1602

Determine flow table entry to use for processing network packet. Flow table entry can include flow epoch value and VNIC indicator. 1603

Determine VNIC datapath epoch value for VNIC indicated by VNIC indicator. 1604

1606
Use current flow table entry to process network packet in packet processing pipeline circuit.

No

Flow epoch value less than VNIC datapath epoch value? 1605

Yes

Done

Send network packet (PHV) to control plane 1607

Control plane uses network configuration to produce new flow table entry and updates flow table entry in flow table with new flow table entry. 1608

Control plane may process the network packet or may send the network packet back to the data plane (e.g., packet processing pipeline circuit). 1609

FIG. 16

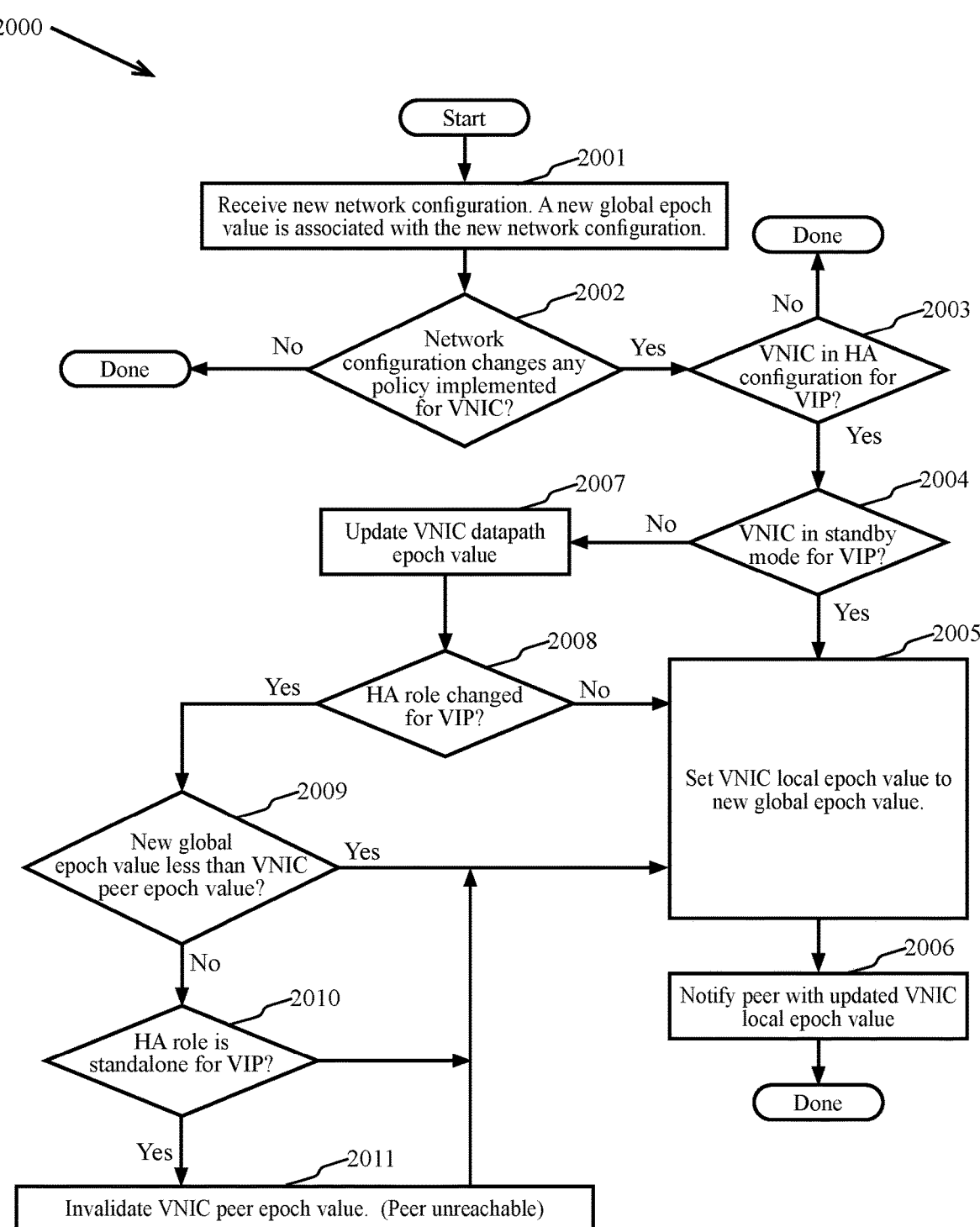

2000

Start

2001
Receive new network configuration. A new global epoch value is associated with the new network configuration.

2002
Network configuration changes any policy implemented for VNIC?

No → Done

Yes → 2003
VNIC in HA configuration for VIP?

No → Done

Yes → 2004
VNIC in standby mode for VIP?

No → 2007
Update VNIC datapath epoch value

Yes → 2005
Set VNIC local epoch value to new global epoch value.

2008
HA role changed for VIP?

No → 2005

Yes → 2009
New global epoch value less than VNIC peer epoch value?

Yes → 2005

No → 2010
HA role is standalone for VIP?

Yes → 2011
Invalidate VNIC peer epoch value. (Peer unreachable)

2006
Notify peer with updated VNIC local epoch value

Done

FIG. 20

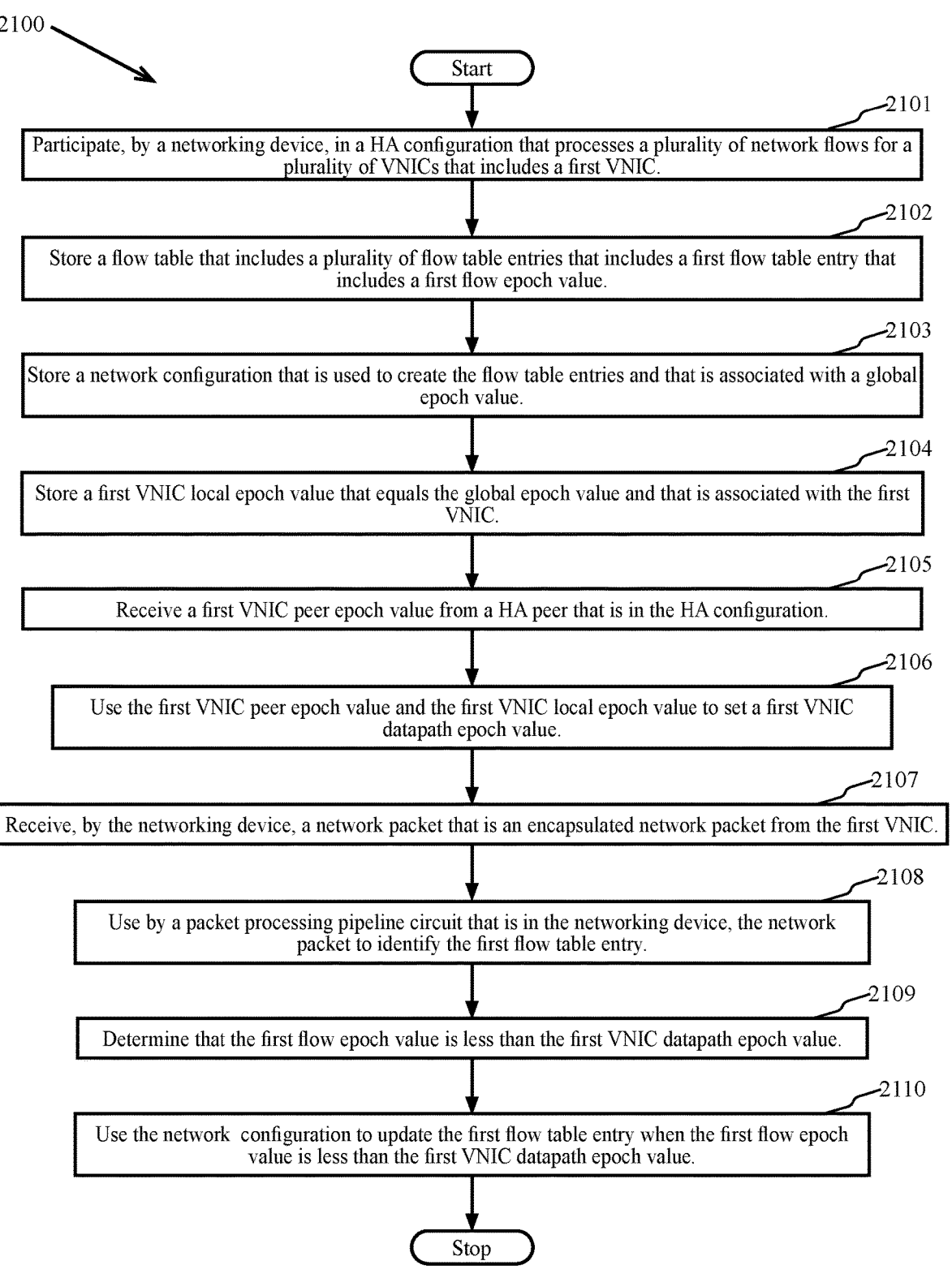

2100

Start

2101
Participate, by a networking device, in a HA configuration that processes a plurality of network flows for a plurality of VNICs that includes a first VNIC.

2102
Store a flow table that includes a plurality of flow table entries that includes a first flow table entry that includes a first flow epoch value.

2103
Store a network configuration that is used to create the flow table entries and that is associated with a global epoch value.

2104
Store a first VNIC local epoch value that equals the global epoch value and that is associated with the first VNIC.

2105
Receive a first VNIC peer epoch value from a HA peer that is in the HA configuration.

2106
Use the first VNIC peer epoch value and the first VNIC local epoch value to set a first VNIC datapath epoch value.

2107
Receive, by the networking device, a network packet that is an encapsulated network packet from the first VNIC.

2108
Use by a packet processing pipeline circuit that is in the networking device, the network packet to identify the first flow table entry.

2109
Determine that the first flow epoch value is less than the first VNIC datapath epoch value.

2110
Use the network configuration to update the first flow table entry when the first flow epoch value is less than the first VNIC datapath epoch value.

Stop

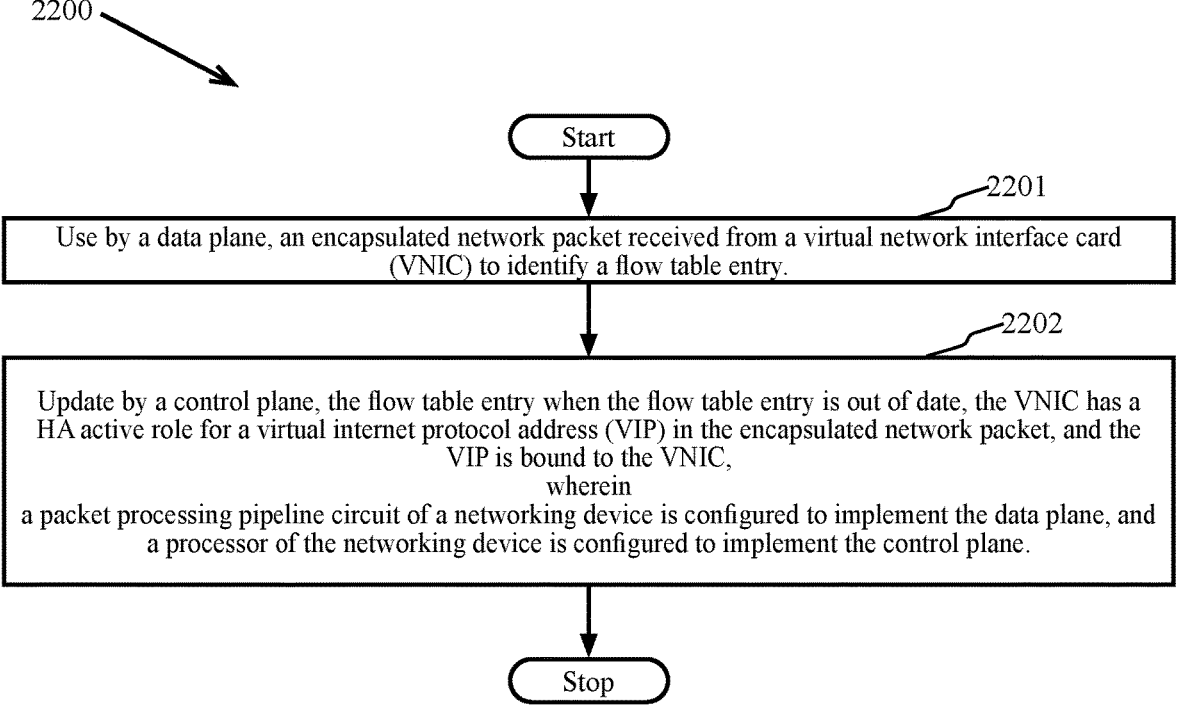

Start

2201

Use by a data plane, an encapsulated network packet received from a virtual network interface card (VNIC) to identify a flow table entry.

2202

Update by a control plane, the flow table entry when the flow table entry is out of date, the VNIC has a HA active role for a virtual internet protocol address (VIP) in the encapsulated network packet, and the VIP is bound to the VNIC,
wherein
a packet processing pipeline circuit of a networking device is configured to implement the data plane, and a processor of the networking device is configured to implement the control plane.

Stop

FIG. 22

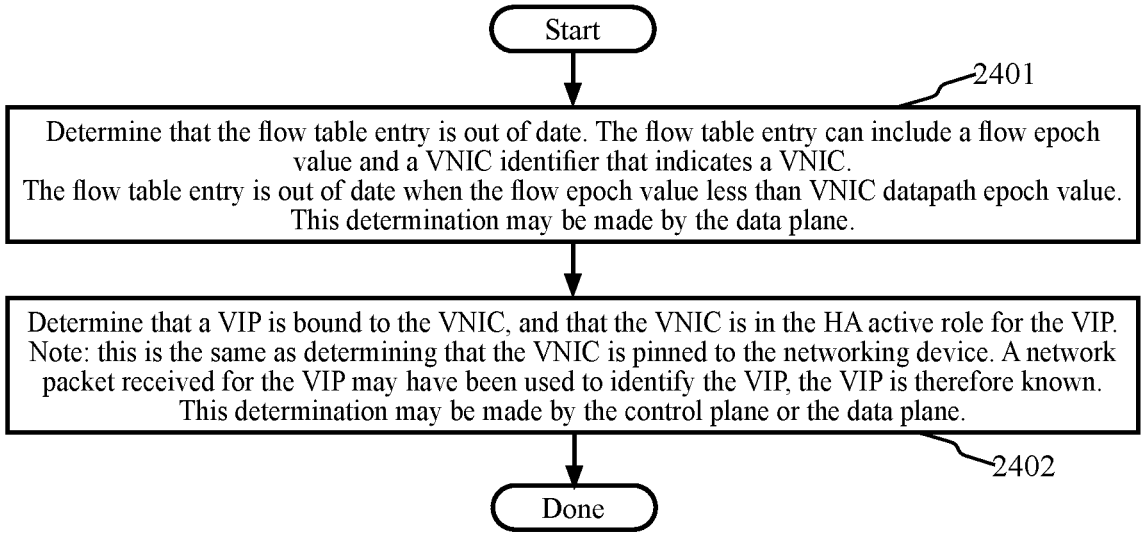

Start

2401

Determine that the flow table entry is out of date. The flow table entry can include a flow epoch value and a VNIC identifier that indicates a VNIC.
The flow table entry is out of date when the flow epoch value less than VNIC datapath epoch value.
This determination may be made by the data plane.

Determine that a VIP is bound to the VNIC, and that the VNIC is in the HA active role for the VIP.
Note: this is the same as determining that the VNIC is pinned to the networking device. A network packet received for the VIP may have been used to identify the VIP, the VIP is therefore known.
This determination may be made by the control plane or the data plane.

2402

Done

FIG. 24

SYSTEMS AND METHODS FOR CONSISTENT CONFIGURATION UPDATE HANDLING IN HIGH AVAILABILITY DEPLOYMENTS USING A GLOBAL CONFIGURATION EPOCH

TECHNICAL FIELD

The descriptions and drawings relate to computer networks, local area networks, high availability (HA) availability network configurations, networking devices such as a router, a switch, a network interface card (NIC), a smartNIC, and a distributed service card (DSC). The descriptions and drawings also relate to elements of networking devices such as semiconductor chips implementing packet processing pipeline circuits, match-action pipelines, and to using global configuration epochs to coordinate the updating of data planes.

BACKGROUND

Networking devices process network traffic flows by receiving network packets and processing the network packets. The network packets are often processed by examining the packet's header data and applying policies such as routing policies, firewall policies, load balancing policies, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a networking device. The P4 domain-specific language for programming the data plane of networking devices has been defined in the "P416 Language Specification," version 1.2.2, as published by the P4 Language Consortium on May 17, 2021. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads when they offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a networking device. The networking device can include a packet processing pipeline circuit configured to implement a data plane, and a processor configured to implement a control plane, wherein the packet processing pipeline circuit and the processor are further configured to implement flow table updating. The flow table updating can include the data plane using an encapsulated network packet received from a virtual network interface card (VNIC) to identify a flow table entry, making a determination that the flow table entry is out of date, that a virtual internet protocol (VIP) address in the encapsulated network packet is bound to the VNIC, and that the VNIC is in a high availability (HA) active role for the VIP address, and the control plane updating the flow table entry in response to making the determination.

Another aspect of the subject matter described in this disclosure can be implemented by a method. The method can include using, by a data plane, an encapsulated network packet received from a virtual network interface card (VNIC) to identify a flow table entry. The method can also include making a determination that the flow table entry is out of date, that a VIP in the encapsulated network packet is bound to the VNIC, and that the VNIC is in a HA active role for the VIP. The method can additionally include updating, by a control plane, the flow table entry in response to making the determination, wherein a packet processing pipeline circuit of a networking device is configured to implement the data plane, and a processor of the networking device is configured to implement the control plane.

Yet another aspect of the subject matter described in this disclosure can be implemented by a networking device. The networking device can include a circuit means for implementing a data plane means, a processor means for implementing a control plane means, and a determination means for making a determination that a flow table entry is out of date, that a VIP is bound to a VNIC implemented by the networking device, and that the VNIC is in a HA active role for the VIP. The flow table entry can be associated with the VIP, and the control plane means can be configured to update the flow table entry in response to the determination means making the determination.

In some implementations of the methods and systems, a VNIC datapath epoch value is determined from a VNIC local epoch value and a VNIC peer epoch value that is the VNIC local epoch value of a HA peer, and a flow epoch value stored in the flow table entry being less than the VNIC datapath epoch value indicates that the flow table entry is out of date. In some implementations of the methods and systems, a network configuration received by the networking device is associated with a global epoch value, and the networking device is configured to update the VNIC local epoch value to equal the global epoch value in response to determining that the network configuration changes a policy that is implemented for the VNIC and that the global epoch value is greater than the VNIC local epoch value. In some implementations of the methods and systems, the control plane is configured to update the VNIC datapath epoch value after updating the VNIC local epoch in response to determining that the VNIC has the HA active role for the VIP and the VIP is bound to the VNIC. In some implementations of the methods and systems, updating the VNIC datapath epoch value includes incrementing the VNIC datapath epoch value by one in response to determining that the VNIC peer epoch value equals the VNIC local epoch value. In some implementations of the methods and systems, updating the VNIC datapath epoch value includes incrementing the VNIC datapath epoch value by a difference between the VNIC local epoch value and the VNIC peer epoch value in response to determining that the VNIC peer epoch value does not equal the VNIC local epoch value.

In some implementations of the methods and systems, the VNIC local epoch value is not updated in response to receiving the network configuration after determining that none of a plurality of policies that are implemented for the VNIC are changed by the network configuration. In some implementations of the methods and systems, a second VNIC local epoch value and a second VNIC datapath epoch value are associated with a second VNIC, the networking device is configured to update the second VNIC local epoch value to equal the global epoch value in response to determining that the network configuration changing a second policy implemented for the second VNIC, and the networking device is configured to update the second VNIC datapath epoch value in response to determining that the second VNIC has the HA active role for a second VIP that is bound to the second VNIC. In some implementations of the methods and systems, the networking device is configured to send a sync packet to the HA peer, the sync packet includes a flow table update for the flow table entry, and the flow epoch value included in the flow table update equals the global epoch value.

In some implementations of the methods and systems, the networking device is configured to send the VNIC local epoch value to the HA peer after updating the VNIC local epoch value. In some implementations of the methods and systems, the VNIC peer epoch value does not equal the VNIC local epoch value. In some implementations of the methods and systems, the VNIC local epoch value is less than a global epoch value associated with a HA configuration that include the networking device and the HA peer. In some implementations of the methods and systems, the networking device is configured to receive a sync packet for the flow table entry, the sync packet includes a second flow epoch value of the flow table entry, and the networking device is configured to use the sync packet to update the flow table entry in response to determining that the second flow epoch value is greater than the flow epoch value. In some implementations of the methods and systems, the networking device is configured to transition to a standby role for the VNIC in response to the HA peer transitioning to an HA active role. In some implementations of the methods and systems, the data plane is configured to determine that the flow table entry is out of date, the control plane is configured to determine that the VIP is bound to the VNIC, and the control plane is configured to determine that the VNIC is in the HA active role for the VIP.

In some implementations of the methods and systems, a VNIC datapath epoch value is determined from a VNIC local epoch value and a VNIC peer epoch value that is the VNIC local epoch value of a HA peer, and updating the flow table entry includes setting a flow epoch value that is in the flow table entry to equal the VNIC datapath epoch value. In some implementations of the methods and systems, the method further includes receiving a network configuration that is associated with a global epoch value, and setting the VNIC local epoch value to equal the global epoch value in response to determining that the network configuration changes a policy that is implemented for the VNIC and that the global epoch value is greater than the VNIC local epoch value. In some implementations of the methods and systems, the method further includes using the VNIC local epoch value to update the VNIC datapath epoch value after updating the VNIC local epoch and after determining that the VNIC has the HA active role for the VIP in the encapsulated network packet and that the VIP is bound to the VNIC.

These and other aspects will become more fully understood upon a review of the detailed description, which follows. Other aspects, features, and characteristics will become apparent to those of ordinary skill in the art, upon reviewing the following description of specific, examples in conjunction with the accompanying figures. While features may be discussed relative to certain examples and figures below, all examples may include one or more of the advantageous features discussed herein. In other words, while one or more examples may be described as having certain advantageous features, one or more of such features may be included any of the examples discussed herein. In similar fashion, while the examples may be discussed below as a device, a system, or a method, the examples may be implemented in various devices, systems, and methods.

BRIEF DESCRIPTION OF THE DRAWINGS

FIG. 10 is a high-level flow diagram illustrating a process that can determine whether a VNIC is pinned to a networking device, according to some aspects.

FIG. 11 is a high-level diagram of a flow table entry, according to some aspects.

FIG. 12 is a high-level conceptual diagram illustrating a sync packet according to some aspects.

FIG. 14 is a high-level flow diagram illustrating a process that helps determine whether a network configuration update changes a policy implemented for a VNIC, according to some aspects.

FIG. 15 is a high-level flow diagram illustrating a process that determines which VNICs are affected by a policy that is changed by a network configuration update, according to some aspects.

FIG. 16 is a high-level flow diagram illustrating a process that conditionally updates a flow table entry based on a flow epoch value and a VNIC datapath epoch value, according to some aspects.

FIG. 20 is a high-level flow diagram illustrating a process that updates VNIC epoch values based on a new network configuration, according to some aspects.

FIG. 21 is a high-level flow diagram illustrating a method for consistent configuration update handling in high availability deployments using a global configuration epoch, according to some aspects.

FIG. 22 is another high-level flow diagram illustrating a method for consistent configuration update handling in high availability deployments using a global configuration epoch, according to some aspects.

FIG. 24 is a high-level flow diagram illustrating a process that makes a determination that the flow table entry is out of date, that the VIP is bound to the VNIC, and the VNIC is in the HA active role for the VIP, according to some aspects.

Throughout the description, similar reference numbers may be used to identify similar elements.

DETAILED DESCRIPTION

Figure 1:
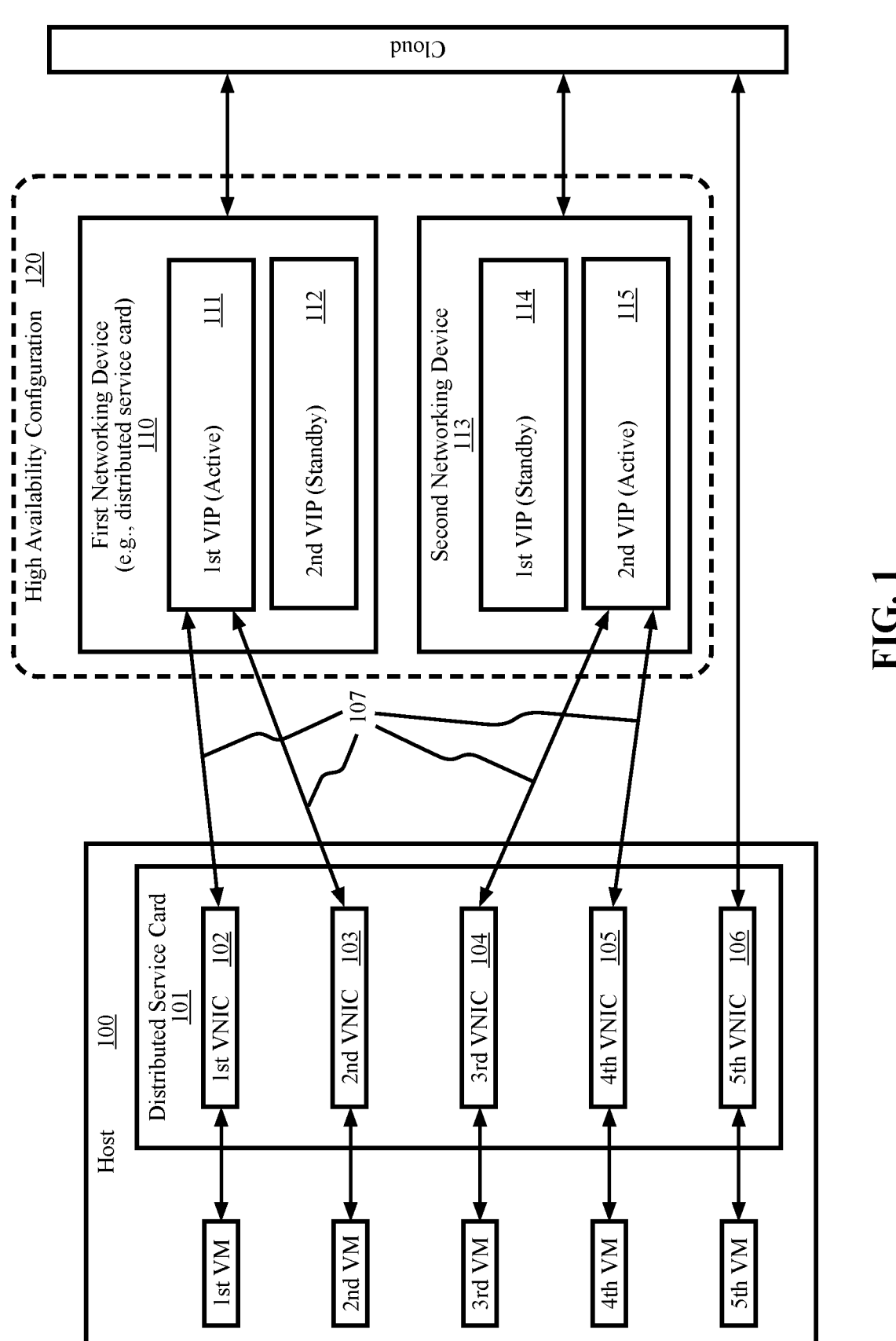
FIG. 1 is a high-level conceptual diagram of a high availability (HA) configuration that is processing network packets for virtual network interface cards (VNICs), according to some aspects.

It will be readily understood that the examples and aspects of the examples generally described herein and illustrated in the appended figures could be arranged and designed in a wide variety of different configurations. Thus, the following more detailed description and the figures are not intended to limit the scope of the present disclosure, but merely present illustrative examples. The drawings are not necessarily drawn to scale unless specifically indicated. The described examples are to be considered in all respects only as illustrative and not restrictive. The scope of the claims is therefore indicated by the claims themselves rather than this detailed description or the drawings. All changes which come within the meaning and range of equivalency of the claims are to be embraced within their scope.

Reference throughout this specification to features, advantages, or similar language does not imply that all the features and advantages that may be realized should be or must be in any single example. Rather, language referring to the features and advantages is understood to mean that a specific feature, advantage, or characteristic described in an example is included in that example and possibly in other examples. Thus, discussions of the features and advantages, and similar language, throughout this specification may, but do not necessarily, refer to the same example.

Furthermore, the described features, advantages, characteristics, and aspects may be combined in any suitable manner in one or more example. One skilled in the relevant art will recognize, in light of the description herein, that one or more of the features, advantages, characteristics, or aspects may be omitted from some examples. Other examples may include additional features and advantages.

In the field of data networking, the functionality of networking devices such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. A match-action pipeline has a series of match-action stages. Upon receiving a packet of a network traffic flow, the first match-action stage of a match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action stage can perform a default action. Match-action stages may pass the packet to a subsequent match-action stage in the match-action pipeline.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

Data centers can contain a plethora of servers and each server can run several virtual machines (VMs). Each of those VMs can be provisioned with a virtual network interface card (VNIC) for connecting the VM to a computer network. A VNIC is a virtualized representation of a NIC that appears to be an actual NIC from the perspective of the host, server, or VM that is using the VNIC for network communications. The VNIC can connect to the internet or another network via a HA configuration. An HA configuration can have two network devices that are configured to use a virtual internet protocol (VIP) address. As is known to those practiced in computer networking, the networking devices in the HA configuration select which of the two networking devices is active (HA role=active) and which is standby (HA role=standby). For example, in a network configuration in which a first networking device has the HA role set to "active" and a second network device has an HA role set to "standby," traffic with a destination IP address of VIP is directed to the first networking device, while the second networking device is ready to receive the traffic instantaneously in the event of a failover. The VNICs can send encapsulated network packets to the VIP such that the networking device in the active role for the VIP receives the encapsulated packet. The networking device may then decapsulate the network packet and process it according to a network configuration that contains policies for processing such network packets.

An issue that arises in using HA configurations for processing encapsulated network packets for VNICs is flow table synchronization within the HA configuration. There is no guarantee that the networking devices in the HA configuration will receive new network configurations at the same time. In fact, one of the networking devices might not receive a new network configuration at all. Furthermore, one of the networking devices may be active for some VIPs while the other network device is active for other VIPs. Even so, the networking devices must synchronize their flow tables such that the standby device can become the active device for a VIP and take over the processing of network flows for that VIP and for VNICs using that VIP.

Heuristics using epoch values associated with the network configurations, the VNICs, the flow table entries, and the data planes of HA peers can maintain consistency between the flow tables of the HA peers even when the peers have different network configuration versions. Each peer stores a VNIC local epoch value and updates that VNIC local epoch value when a new network configuration is received that changes any policy being implemented for a VNIC, but only when such a policy is changed. The peers share their VNIC local epoch values. Each peer therefore stores a VNIC peer epoch value, as well as its own VNIC local epoch value. The values can be different. The heuristics discussed herein detect when the peers have different VNIC local epoch values and use the difference, if any, to adjust each peer's VNIC datapath epoch value. Flow table entries can then be updated, or not, based on whether a flow is pinned to a particular device, whether the update is due to a flow sync packet, etc. The heuristics can be implemented independently by each peer. Such heuristics are more robust than techniques requiring more coordination between the networking devices while also guaranteeing flow table consistency.

FIG. 1 is a high-level conceptual diagram of a high availability (HA) configuration 120 that is processing network packets for virtual network interface cards (VNICs), according to some aspects. The network packets are encapsulated network packets 107. An encapsulated network packet is encapsulated in another network packet such as a virtual extensible local area network (VxLAN) packet or a Network Virtualization using Generic Routing Encapsulation (NVGRE) packet. For example, a VxLAN packet having the VIP as its destination address is routed to and received by the networking device that has the active HA role for the VIP. The networking device may decapsulate the network packet that is encapsulated in the VxLAN packet and then process that network packet in accordance with the networking device's network configuration. A DSC 101 is implementing VNICs for use by VMs running in the host 100. The HA configuration 120 includes a first networking device 110 and a second networking device 113. The first networking device 110 has the first VIP active HA role 111 and the second VIP standby HA role 112. The second networking device 113 has the first VIP standby HA role 114 and the second VIP active HA role 115. The VNICs provided by the DSC 101 in the host 100 include a first VNIC 102, a second VNIC 103, a third VNIC 104, a fourth VNIC 105, and a fifth VNIC 106.

The VNICs are configured to encapsulate network packets in outer packets (e.g., VxLAN packets or NVGRE packets) and to use the VIPs as the destination addresses of the outer packets such that the outer packets are received by the networking devices in the HA configuration 120. The first VNIC 102 addresses outer packets to the first VIP. The second VNIC 103, addresses outer packets to the first VIP. The third VNIC 104, addresses outer packets to the second VIP. The fourth VNIC 105, addresses outer packets to the second VIP. The fifth VNIC 106 does not use the HA configuration, instead sending the network packets directly to the cloud without encapsulation. The first networking device 110 receives the encapsulated packets from the first VNIC 102 when the first networking device has the HA active role for the first VIP. The first networking device 110 receives the encapsulated packets from the second VNIC 103 when the first networking device has the HA active role for the first VIP. The second networking device 113 receives the encapsulated packets from the third VNIC 104 when the second networking device has the HA active role for the second VIP. The second networking device 113 receives the encapsulated packets from the fourth VNIC 105 when the second networking device has the HA active role for the second VIP.

Figure 2:
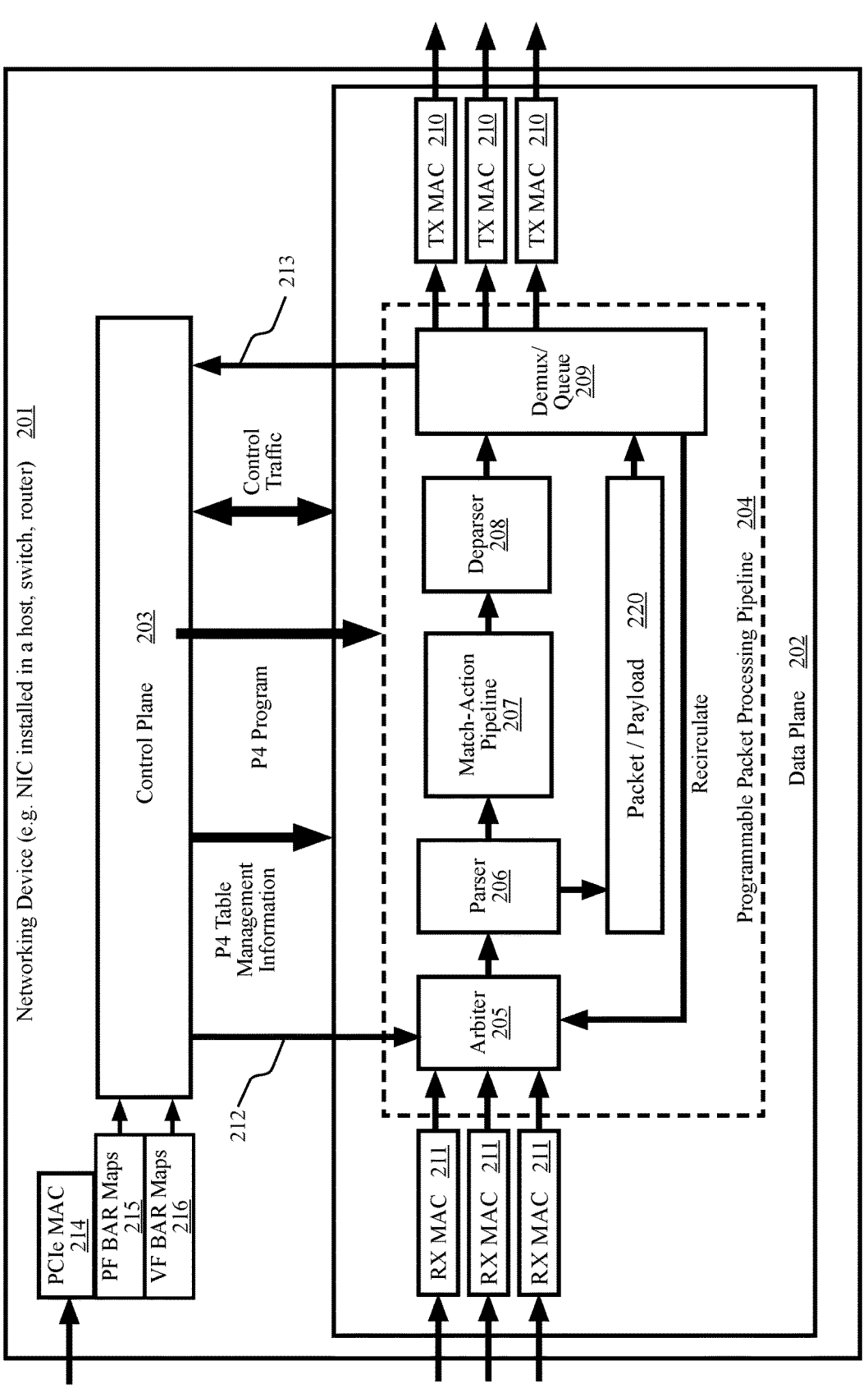
FIG. 2 is a functional block diagram of a networking device having a control plane and a data plane and in which aspects may be implemented.

FIG. 2 is a functional block diagram of a networking device having a control plane and a data plane and in which aspects may be implemented. A networking device 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QOS), filtering, encapsulation, queuing, and policing. Although some functions of the control plane and data plane are described, other functions may be implemented in the control plane and/or the data plane.

Some techniques exist for providing flexibility at the data plane of networking devices that are used in data networks. For example, the concept of a domain-specific language for programming protocol-independent packet processors, known simply as "P4," has developed as a way to provide some flexibility at the data plane of a networking device. The document "P416 Language Specification," version 1.2.2, published by the P4 Language Consortium on May 17, 2021, which is incorporated by reference herein, describes the P4 domain-specific language that can be used for programming the data plane of networking devices. P4 (also referred to herein as the "P4 specification," the "P4 language," and the "P4 program") is designed to be implementable on a large variety of targets including switches, routers, programmable NICs, software switches, semiconductor chip, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output central processing unit (CPU) port 213. The control plane is often referred to as a CPU although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the networking device. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A networking device 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The Infini-Band PF and VFs can be used for data transfers, such as remote direct memory access (RDMA) transfers to other VMs running on the same or other host computers. Simi-larly, a NIC can provide non-volatile memory express (NVMe) and small computer system interface (SCSI) PFs and VFs to VMs running on the host.

Figure 3:
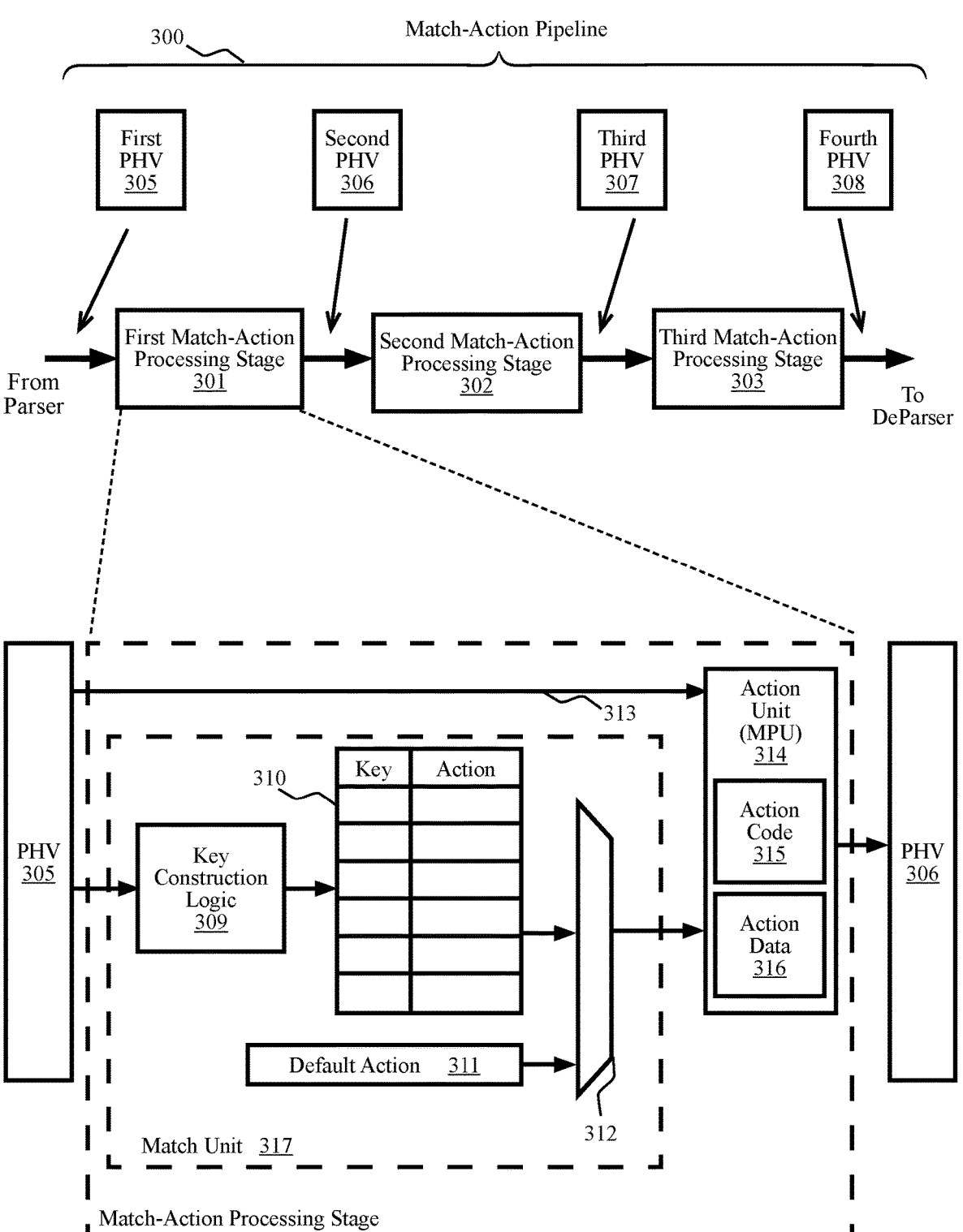
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often called stages or match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action processing stages in the match-action pipeline in series and each match-action processing stages can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308. The match-action process-ing stages are arranged as a match-action pipeline that passes the PHVs from one match-action processing stage to the next match-action processing stage in the pipeline.

An expanded view of elements of a match-action pro-cessing stage 301 of match-action pipeline 300 is shown. The match-action processing stage includes a match unit 317 (also referred to as a "table engine") that operates on an input PHV 305 and an action unit 314 that produces an output PHV 306, which may be a modified version of the input PHV 305. The match unit 317 can include key con-struction logic 309, a lookup table 310, and selector logic 312. The key construction logic 309 is configured to gen-erate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including com-plex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action processing stages can be programmable by the control plane via P4 and the contents of the lookup table can be managed by the control plane.

Figure 4:
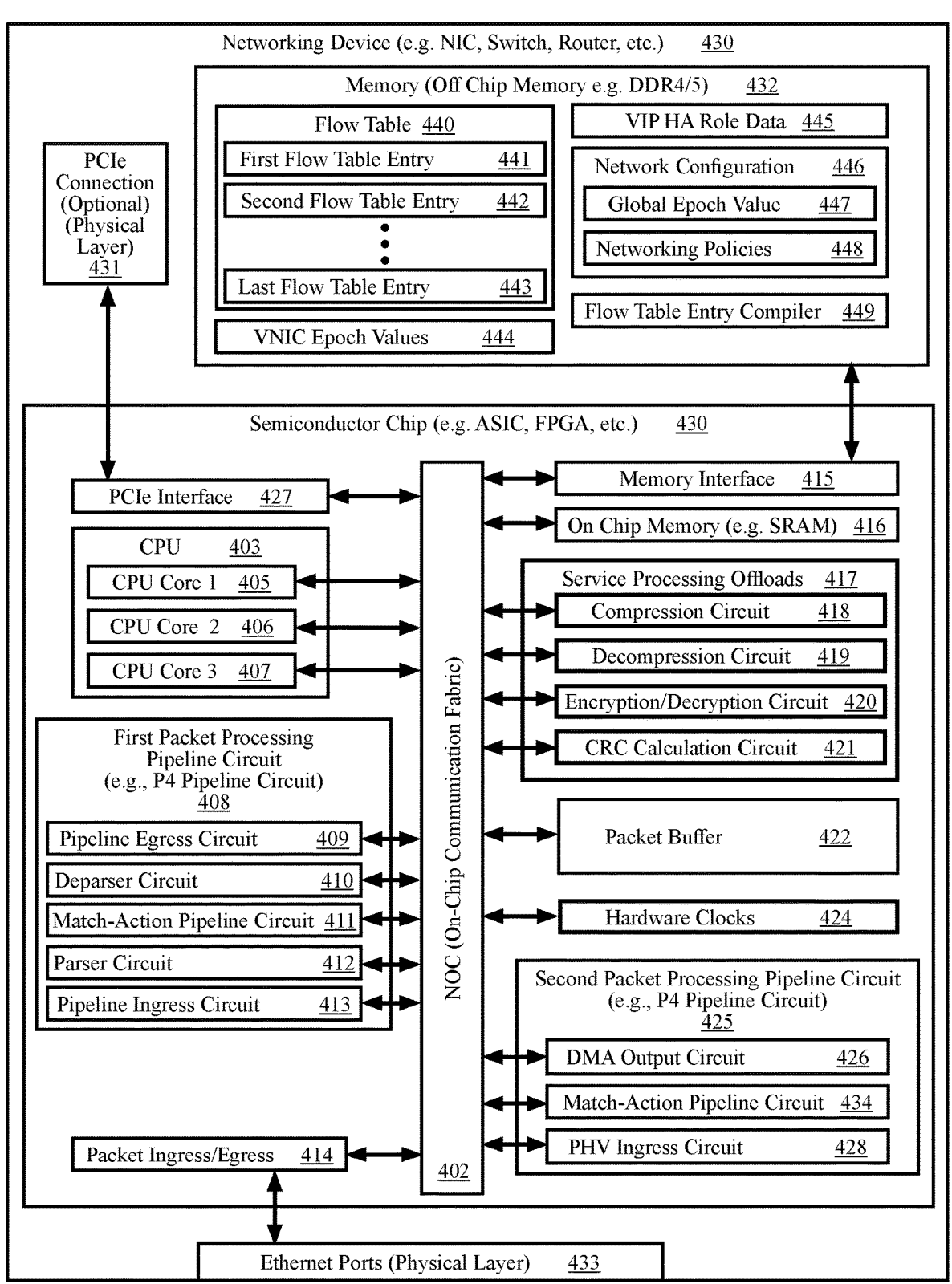
FIG. 4 is a functional block diagram of a networking device having a semiconductor chip such as an application specific integrated circuit (ASIC) or field programmable gate array (FPGA), according to some aspects.

FIG. 4 is a functional block diagram of a networking device 430 having a semiconductor chip 401 such as an ASIC or FPGA, according to some aspects. The semicon-ductor chip 401 shows a single semiconductor chip imple-menting a large number of hardware functions. A different and substantially equivalent implementation may employ a chiplet architecture. If the networking device is a network interface card (NIC) then the NIC can be installed in a host computer and can act as a networking device for the host computer and for virtual machines running on the host computer. Such a NIC can have a PCIe connection 431 for communicating with the host computer via a host PCIe connection. The networking device 430 can have a semi-conductor chip 401, off chip memory 432, and ethernet ports 433. The off-chip memory 432 can be one of the widely available memory modules or chips such as double data rate 5 (DDR5) synchronous dynamic random-access memory (SDRAM) such that the semiconductor chip 401 has access to many gigabytes of memory on the networking device 430. The ethernet ports 433 provide physical connectivity to a computer network such as the internet. The NIC can include a printed circuit board to which the semiconductor chip 401 and the memory 432 are attached.

The semiconductor chip can have many core circuits interconnected by an on-chip communications fabric, some-times called a network on a chip (NOC) 402. NOCs are often implementations of standardized communications fabrics such as the widely used advanced extensible interface (AXI) bus. The semiconductor chip's core circuits can include a PCIe interface 427, CPU 403, first packet processing pipe-line circuit 408, memory interface circuit 415, on chip memory such as static random access memory (SRAM) 416, service processing offloads 417, a packet buffer 422, meter-ing circuit 423, and packet ingress/egress circuits 414. The PCIe interface 427 can be used to communicate with a host computer via the PCIe connection 431. The CPU 403 can include numerous CPU cores such as a first CPU core 405, a second CPU core 406, and a third CPU core 407. The first packet processing pipeline circuit 408 can include a pipeline ingress circuit 413, a parser circuit 412, match-action pipe-line circuit 411, a deparser circuit 410, and a pipeline egress circuit 409. The second packet processing pipeline circuit 425 can include a PHV ingress circuit 428, a match-action pipeline circuit 434, and a direct memory access (DMA) output circuit 426. The service processing offloads 417 are circuits implementing functions that the semiconductor chip uses so often that the designer has chosen to provide hardware for offloading those functions from the CPU. The service processing offloads can include a compression cir-cuit 418, decompression circuit 419, an encryption/decryp-tion circuit 420, and a general use CRC calculation circuit 421. The general use CRC calculation circuit 421 can calculate digest values for data blocks. For example, the general use CRC calculation circuit 421 can calculate Ethernet FCS values. The specific core circuits implemented within the non-limiting example of the semiconductor chip 401 can be selected such that the semiconductor chip implements many, perhaps all, of the functionality of an InfiniBand channel adapter, of an NVMe card, and of a networking device that processes network traffic flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The first packet processing pipeline circuit 408 is a specialized set of elements for processing PHVs including PHVs for network packets such as internet protocol (IP) packets and InfiniBand protocol data units (PDUs). The first packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The second packet processing pipeline circuit 425 is a specialized set of elements for processing PHVs including PHVs for network packets such as internet protocol (IP) packets and InfiniBand protocol data units (PDUs). The second packet processing pipeline circuit 425 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The networking device 430 can include a memory 432 for running Linux or some other operating system and for storing data used by the processes implementing network services, upgrading the control plane, and upgrading the data plane. The networking device can use the memory 432 to store a flow table 440, VNIC epoch values 444, VIP HA role data 445, a network configuration 446, and a flow table entry compiler. The flow table can include flow table entries that the packet processing pipeline circuit 408 can use for processing the network packets of network flows. The VNIC epoch values can be used for maintaining consistency between the flow table entries in the flow table 440 and the flow table entries of a flow table in a HA peer device. The VIP HA role data 445 may be used for coordinating HA roles with HA peer devices and may also be used for maintaining consistency between the flow table entries in the flow table 440 and the flow table entries of a flow table in a HA peer device. The network configuration 446 can include networking policies 448 and a global epoch value 447. The network configuration may also include IP and VIP binding data that indicates which NIC or VNIC is bound to which IP and VIP addresses. For example, an IP or VIP is bound to a NIC or VNIC when the NIC or VNIC is configured to receive network traffic for that IP or VIP address. A network configuration controller can send network configurations to the networking devices. The network configurations are associated with a global epoch value that can indicate the version of the network configuration. For example, the global epoch value may be an integer that is incremented with each new network configuration. In another example, the global epoch value is a timestamp that may be the creation time and date of the network configuration. Such a timestamp may be treated as an integer or some other value where a greater value indicates more recent in time. The networking policies 448 are the policies that govern how the networking device is to process network packets. The flow table entry compiler 449 can use the networking policies to create flow table entries. The packet processing pipeline circuit uses the flow table entries for processing network packets. For example, a network packet can have a source address, destination address, source port number, destination port number, and protocol identifier. These five values are often called the packet's 5-tuple. The flow table entry compiler can apply the networking policies to a 5-tuple to thereby determine what policies are to be applied to a network packet having that 5-tuple. The policies can be to allow, drop, rewrite, reroute, encapsulate, decapsulate, etc. a network packet. The policies to apply to a particular 5-tuple can be indicated in or included in the flow table entry that the flow table entry compiler creates for that 5-tuple. The flow table entry can be stored in the flow table for use by the packet processing pipeline circuit. As such, the packet processing pipeline circuit can apply policies without having to derive the policies from the networking policies.

The CPU cores 405, 406, 407 can be general purpose processor cores, such as ARM processor cores, microprocessor without interlocked pipelined stages (MIPS) processor cores, and/or x86 processor cores, as is known in the field. Each CPU core can include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as layer 7 applications (e.g., HTTP load balancing, layer 7 firewalling, and/or layer 7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by a packet processing pipeline circuits 408, 425.

The first packet processing pipeline circuit 408 can be a specialized circuit or part of a specialized circuit using one or more semiconductor chips such as ASICs or FPGAs to implement programmable packet processing pipelines such as the programmable packet processing pipeline 204 of FIG. 2. Some examples include semiconductor chips such as ASICs or FPGAS implementing a P4 pipeline as a fast data path or data plane within the networking device.

All data transactions in the semiconductor chip 401, including on-chip memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the first packet processing pipeline circuit 408, the second packet processing pipeline circuit 425, CPU 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
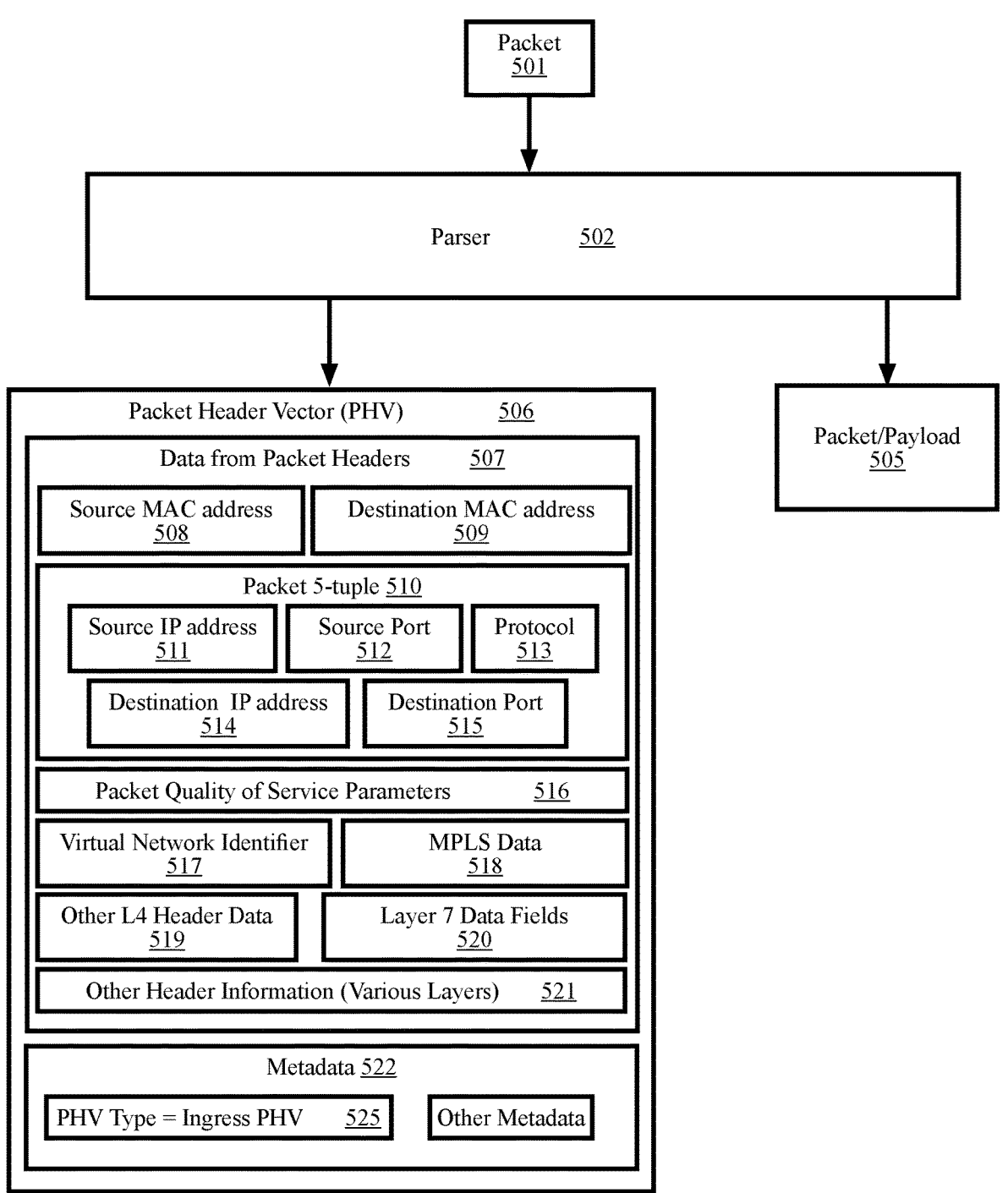
FIG. 5 is a high-level diagram illustrating an example of generating a packet header vector from a packet according to some aspects.

FIG. 5 is a high-level diagram illustrating an example of generating an ingress packet header vector (PHV) 506 from a packet 501 according to some aspects. The PHV 506 is an ingress PHV that it is produced by a parser 502 parsing a packet 501 received via an ingress port as a bit stream. The parser 502 can receive a packet 501 that has layer 2, layer 3, layer 4, and layer 7 headers and payloads. The parser can generate a PHV 506 from packet 501. The packet header vector 506 can include many data fields including data from packet headers 507 and metadata 522. The metadata 522 can include data generated by the networking device such as the hardware port on which the packet 501 was received and the packet timestamps indicating when the packet 501 was received by the networking device, enqueued, dequeued, etc. The metadata 522 can also include data produced by the networking device while processing a packet or assembling a packet. Such metadata 522 can include a PHV type 525 (e.g., "Ingress PHV").

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet 5-tuple 510 is often used for generating keys for match tables. The packet 5-tuple 510 can include packet header field values such as the source IP address 511, the source port 512, the protocol 513, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 is a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
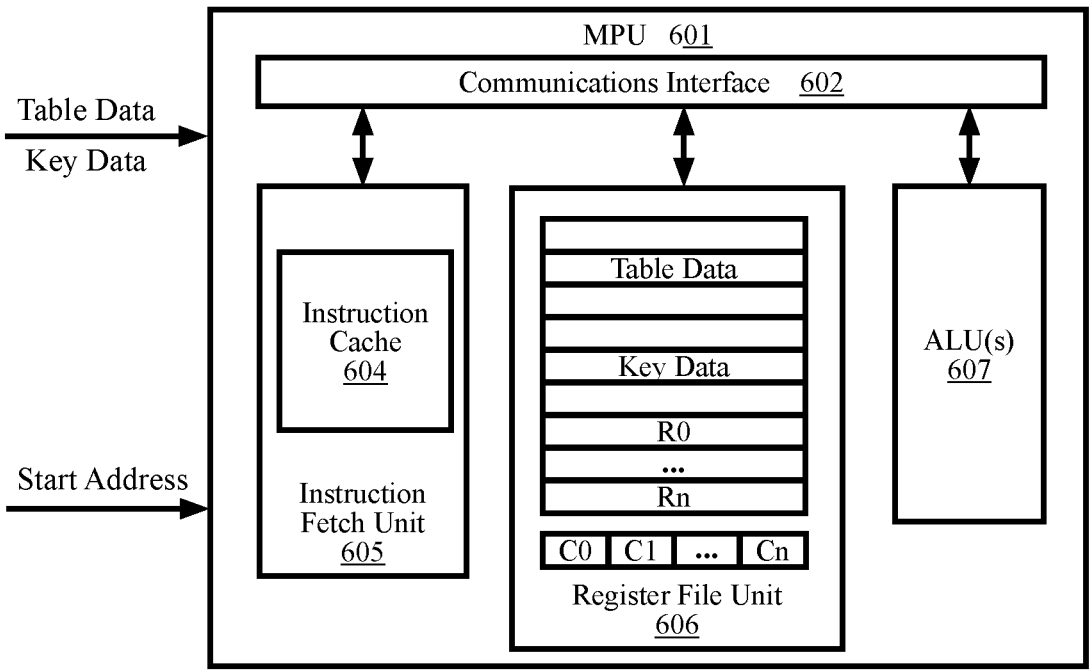
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the examples in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some examples, each register of the register file is 64 bits and may be initially loaded with special metadata values such as hash value from table lookup, packet size, PHV timestamp, programmable table constant and the like.

In some examples, the register file unit 606 can have a comparator flags unit (e.g., C0, C1, . . . . Cn) configured to store comparator flags. The comparator flags can be set by calculation results generated by the ALU which in return can be compared with constant values in an encoded instruction to determine a conditional branch instruction. In some examples, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some examples, a single MPU may be configured to execute instructions of a program until completion of the program. In other examples, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
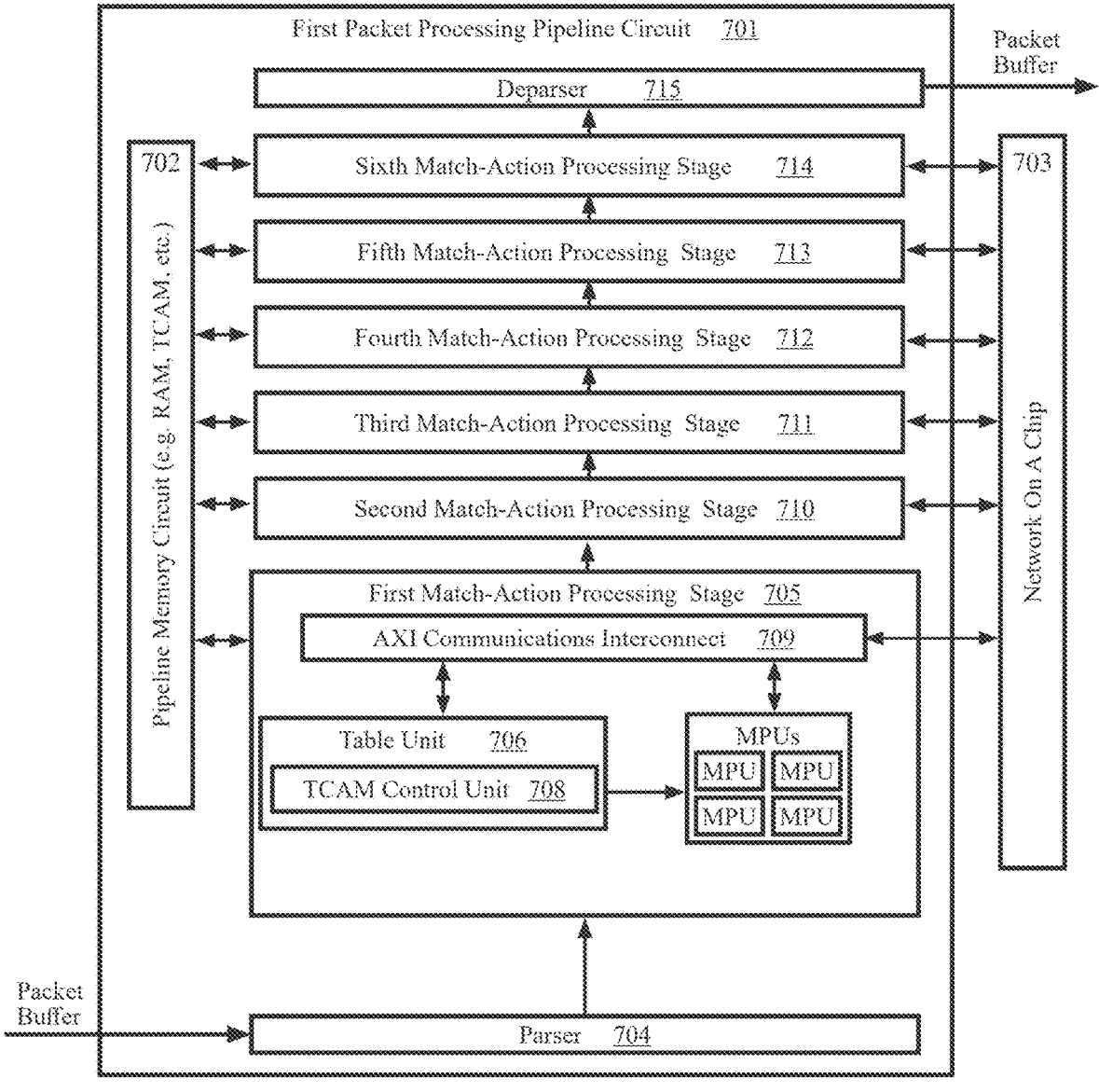
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline circuit in a semiconductor chip. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline circuit 411 implements a match-action pipeline that can have a plurality of stages. For example, a packet entering the pipeline may be first parsed by a parser 704 that is implemented by a parser circuit and that parses the packet according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser circuit that implements a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The networking device 430 of FIG. 4 can have a P4 pipeline that is implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action processing stages 705, 710, 711, 712, 713, 714 can be the same as the MPU 601 of FIG. 6. Match-action processing stages can have any number of MPUs. The match-action processing stage of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action processing stages such as the six units illustrated in the example of FIG. 7. In practice, a match-action pipeline can have any number of match-action processing stages. The match-action processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

The second packet processing pipeline circuit 425 includes a match-action pipeline 434. That match-action pipeline 434 can include match-action processing stages such as match-action processing stages 705, 710, 711, 712, 713, 714.

Figure 8:
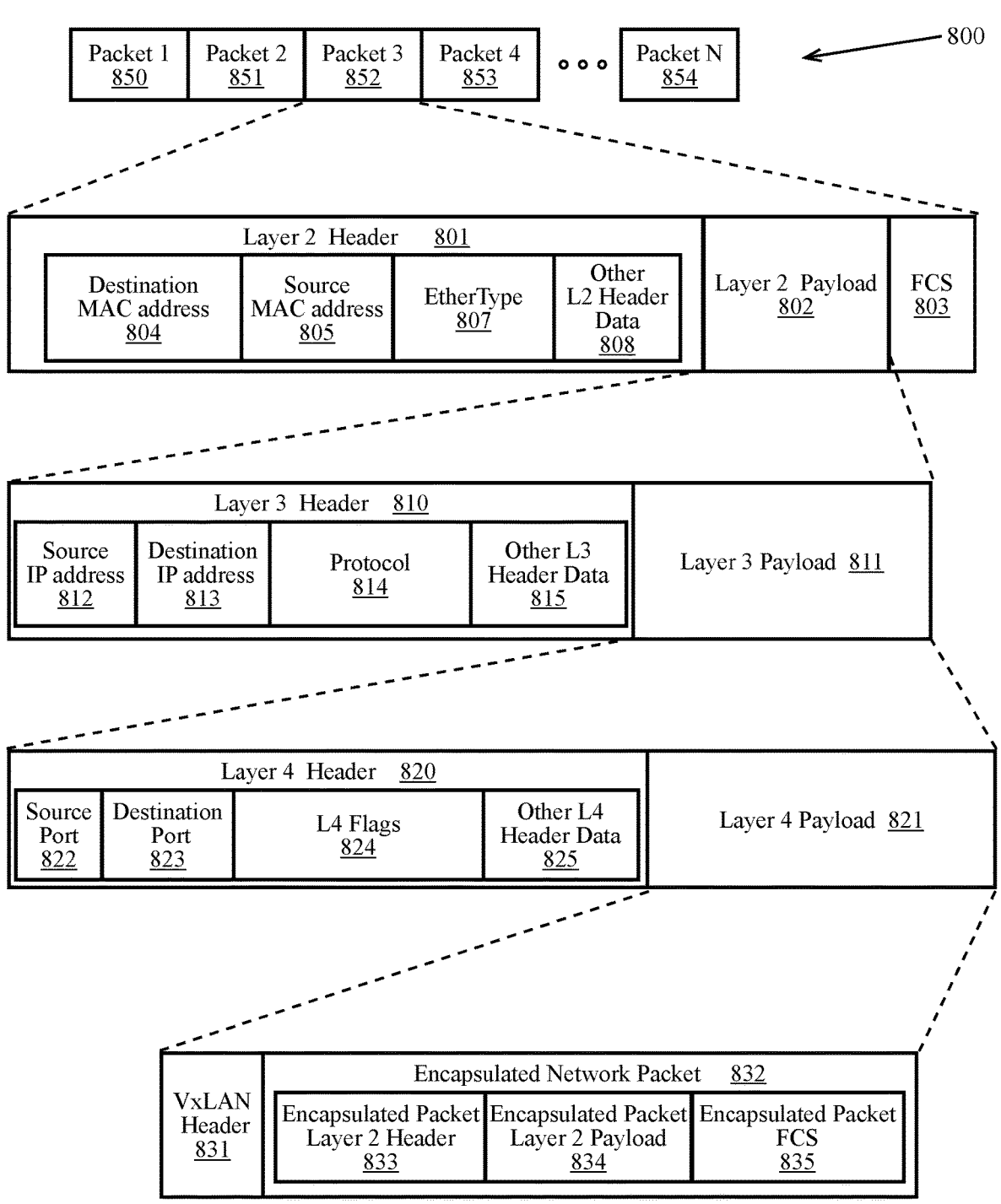
FIG. 8 illustrates packet headers and payloads of packets for network traffic flows including a NVMe/TCP PDU in a layer 4 payload according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a networking device 201 can have MAC addresses. A networking device 201 can have a MAC address that is applied to all or some of the ports. Alternatively, a networking device may have one or more ports that each have their own MAC address. In general, each port can send and receive packets. As such, a port of a networking device can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be networking devices such as networking device 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header of an IP packet is an IP header and the layer 3 payload of an IP packet is an IP payload. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) can have a layer 4 header 820 (a TCP header is shown) and a layer 4 payload 821 (a TCP payload is shown). The layer 4 header 820 can include a source port number 822, destination port number 823, layer 4 flags 824, and other layer 4 header data 825. The source port number 822 and the destination port number 823 can be integer values used by host computers to deliver packets to application programs configured to listen to and send on those ports. The layer 4 flags 824 can indicate a status of or action for a network traffic flow. A layer 4 payload 821 can contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include an encapsulated network packet 832. The encapsulated network packet 832 can include an encapsulated packet layer 2 header 833, an encapsulated packet layer 2 payload 834, and an encapsulated packet FCS 835. A VxLAN header 831 is also included in the layer 4 payload 821 to show that the encapsulated network packet is a network packet that is encapsulated in a VxLAN packet. VxLAN is a well known encapsulation technique that is standardized in IETF RFC 7348. The network packet may be encapsulated in a different type of packet such as a NVGRE packet. NVGRE is a well known encapsulation technique that is standardized in IETF RFC 7637. The encapsulated network packet 832 is shown as a layer 2 packet. As discussed above, a layer 2 packet may contain a layer 3 packet that may contain a layer 4 packet and so on. For example, the VxLAN packet can be a UDP packet that encapsulates a TCP/IP packet. The destination address of the VxLAN packet may be a VIP of the HA configuration such that the networking device that is active for the VIP receives the VxLAN packet. The networking device can process the VxLAN packet by decapsulating the encapsulated network packet. The networking device may then process the network packet. The packet processing pipeline circuit can process the network packet by looking up the flow table entry for the network packet and then applying the policies indicated in the flow table entry to the network packet.

Figure 9:
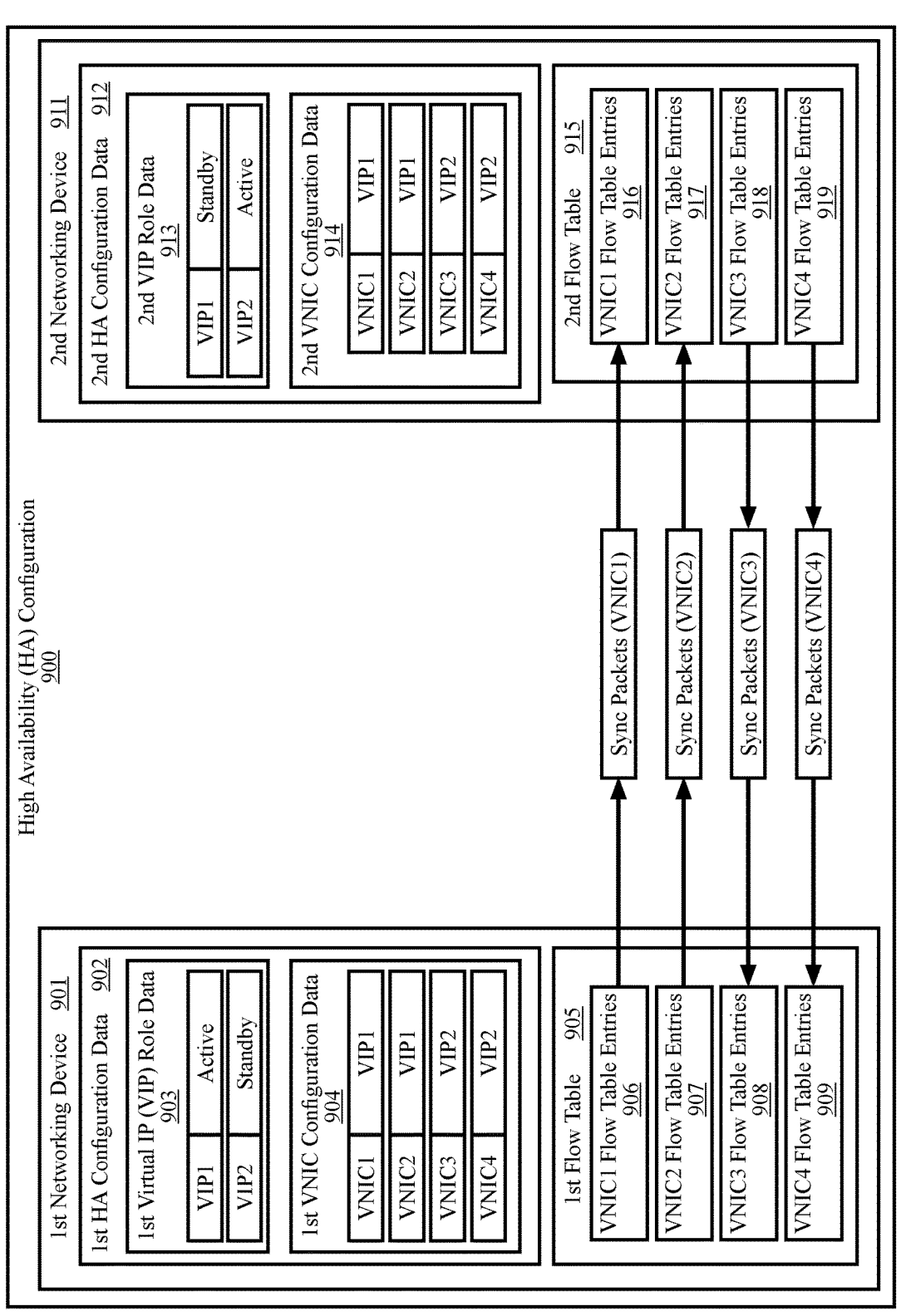
FIG. 9 is a high-level conceptual diagram illustrating syncing of status data between two networking devices according to some aspects.

FIG. 9 is a high-level conceptual diagram illustrating syncing of status data between two networking devices according to some aspects. A HA configuration 900 can include numerous networking devices such as the first networking device 901 and the second networking device 911. As such, the first networking device 901 and the second networking device 911 are participating in the HA configuration 900. The networking devices can have flow tables and HA configuration data that is different for the different networking devices. The first networking device 901 includes a first memory that stores the first HA configuration data 902 and the first flow table 905. The first HA configuration data can include first VIP role data 903 and the first VNIC configuration data 904. The VIP role data can indicate a network device's current HA role for a particular VIP. The first VIP role data 903 indicates that the first networking device is currently in the active role for VIP1 and is currently in the standby role for VIP2. The first VNIC configuration data 904 indicates that two VNICs are using VIP1 and two other VNICs are using VIP2. VNIC1 and VNIC2 are using VIP1 (VIP1 is bound to VNIC1 and is also bound to VNIC2). VNIC3 and VNIC4 are using VIP2 (VIP2 is bound to VNIC3 and is also bound to VNIC 4). The first flow table 905 includes flow table entries that the packet processing pipeline circuit in the first networking device can use to process network packets. The VNIC1 flow table entries 906 can be used to process network packets to and from VNIC1. The VNIC2 flow table entries 907 can be used to process network packets to and from VNIC2. The VNIC3 flow table entries 908 can be used to process network packets to and from VNIC3. The VNIC4 flow table entries 909 can be used to process network packets to and from VNIC4. The first networking device 901 is in the active role for VIP1 which is used by VNIC1 and VNIC2. The first networking device is therefore the networking device that is using the VNIC1 flow table entries 906 and the VNIC2 flow table entries 907 for sending, receiving, and processing network packets for VNIC1 and VNIC2. Changes to a VNIC1 flow table entry or a VNIC2 flow table entry must be communicated to the HA peer, the second networking device 911, such that the HA peer's flow table, the second flow table 915, is ready when the HA peer transitions to the HA active role for VIP1. The HA peer can receive sync packets and can use the sync packets to update its own flow table entries. The second networking device 911 is illustrated as using sync packets from the first networking device 901 to update the VNIC1 flow table entries 916 and to update the VNIC2 flow table entries 917. A networking device that is the active role for a VIP advertises a route (e.g., via BGP) such that network traffic addressed to that VIP is routed to the networking device. As such, the networking device advertises a route that indicates that the networking device is to receive the network flows for the VNICs sending packets to the VIP or receiving packets from the VIP.

The second networking device 911 includes a second memory that stores the second HA configuration data 912 and the second flow table 915. The second networking device is the HA peer of the first networking device. As such, the second memory, which is the memory of the HA peer, may be referred to as the peer memory. The second HA configuration data can include second VIP role data 913 and the second VNIC configuration data 914. The second VIP role data 913 indicates that the second networking device is currently in the standby role for VIP1 and is currently in the active role for VIP2. The second VNIC configuration data 914 indicates that two VNICs are using VIP1 and two other VNICs are using VIP2. VNIC1 and VNIC2 are using VIP1 (VIP1 is bound to VNIC1 and is also bound to VNIC2). VNIC3 and VNIC4 are using VIP2 (VIP2 is bound to VNIC3 and is also bound to VNIC 4). The second flow table 915 includes flow table entries that the packet processing pipeline circuit in the second networking device can use to process network packets. The VNIC1 flow table entries 916 can be used to process network packets to and from VNIC1. The VNIC2 flow table entries 917 can be used to process network packets to and from VNIC2. The VNIC3 flow table entries 918 can be used to process network packets to and from VNIC3. The VNIC4 flow table entries 919 can be used to process network packets to and from VNIC4. The second networking device 911 is in the active role for VIP2 which is used by VNIC3 and VNIC4. The second networking device is therefore the networking device that is using the VNIC3 flow table entries 918 and the VNIC4 flow table entries 919 for sending, receiving, and processing network packets for VNIC3 and VNIC4. Changes to a VNIC3 flow table entry or a VNIC4 flow table entry must be communicated to the HA peer of the second networking device, that peer being the first networking device 901, such that the first networking device's flow table, the first flow table 905, is ready when the first networking device transitions to the HA active role for VIP2. The first networking device can receive sync packets and can use the sync packets to update its own flow table entries. The first networking device 901 is illustrated as using sync packets from the second networking device 911 to update the VNIC3 flow table entries 908 and to update the VNIC4 flow table entries 909.

FIG. 10 is a high-level flow diagram illustrating a process that can determine whether a VNIC is pinned to a networking device 1000, according to some aspects. As used herein, pinned describes a state of a VNIC relative to a network device. The VNIC is pinned when certain conditions are met and is otherwise not pinned. For example, a VNIC is pinned to a networking device when the VNIC is implemented by the networking device and a VIP on the VNIC has the HA active role. FIG. 10 illustrates a process by which the state of a VNIC relative to a networking device can be tested to thereby determine whether the VNIC is pinned to the networking device. A networking device may use the process to determine whether a VNIC is pinned to the networking device. The VNIC is known at the start of the process and the VIP is bound to the VNIC. A VIP is bound to a VNIC when the VNIC is configured for sending or receiving network traffic for the VIP. After the start, at block 1001 the process can read the VIP of the VNIC from the VNIC configuration data (e.g., the first VNIC configuration data 904) of the networking device. At block 1002, the process can read the networking device's HA role for the VIP from the VIP role data of the networking device. At decision block 1003, the process determines whether the networking device's HA role for the VIP is active. If the networking device's HA role for the VIP is active at decision block 1003, the process moves to block 1004. Otherwise, the process moves to block 1005. At block 1004, the process indicates that the VNIC is pinned to the networking device. At block 1005, the process indicates that the VNIC is not pinned to the networking device.

FIG. 11 is a high-level diagram of a flow table entry 1101, according to some aspects. The flow table entry may include a network flow identifier 1102, a flow epoch value 1103, a source IP address 812, a destination IP address 813, a source port number 822, a destination port number 823, a protocol indicator 814, other network flow data 1109, a connection state (e.g., a TCP connection state) 1110, a VNIC indicator 1111, and other state data 1112.

The network flow identifier can be a value that a networking device uses internally for identifying a specific network flow. A network flow identifier may be allocated by a networking device when the flow table entry is created for the network flow in the networking device's memory. The networking device may allocate the network flow identifier without coordinating with other devices regarding specifically what identifier to assign for a particular flow. As such, a packet processing pipeline circuit can create entries in the status data without stalling a pipeline stage while coordinating network flow identifier values with other devices. As such, the data plane of one networking device can use sync packets to send data for new network flows to the data plane of the other networking device. The sync packets may also be used to send data for existing flows that change state. The data planes of HA peer devices may continuously exchange sync packets as new flows are created and old flows change state. The expiration of a network flow, which may trigger deleting the status data for the flow, is one possible change of state.

FIG. 12 is a high-level conceptual diagram illustrating a sync packet 1201 according to some aspects. The sync packet can include a sync packet header 1202 and a sync packet payload 1203. The sync packet header can be a packet header such as those shown in FIG. 8. The sync packet payload can include flow table entry sync data 1204 and VNIC epoch value sync data 1205. Comparing the flow table entry sync data 1204 to the flow table entry 1101 illustrated in FIG. 11, it can be seen that the flow table entry sync data 1204 includes data that is needed for determining which flow table entry is to be updated and the data to write into that flow table entry. For example, the packet 5-tuple may be used to locate the flow table entry and the other network flow data 1109 can indicate the policies to be applied to a packet. The network device that sends the sync packet 1201 may have updated the flow epoch value in its own flow table entry to the VNIC local epoch value (of the sending device) or to the global epoch value (according to the sending device). The VNIC epoch value sync data 1205 may therefore include the sender's VNIC local epoch values and the sender's VNIC datapath epoch values. The device that receives a sync packet that includes VNIC epoch value sync data 1205 may store that data as peer data. For example, the sender may include its VNIC1 local epoch value in the VNIC epoch value sync data 1205. The receiving device may then store the sender's VNIC1 local epoch value as the receiver's VNIC1 peer epoch value.

Figure 13:
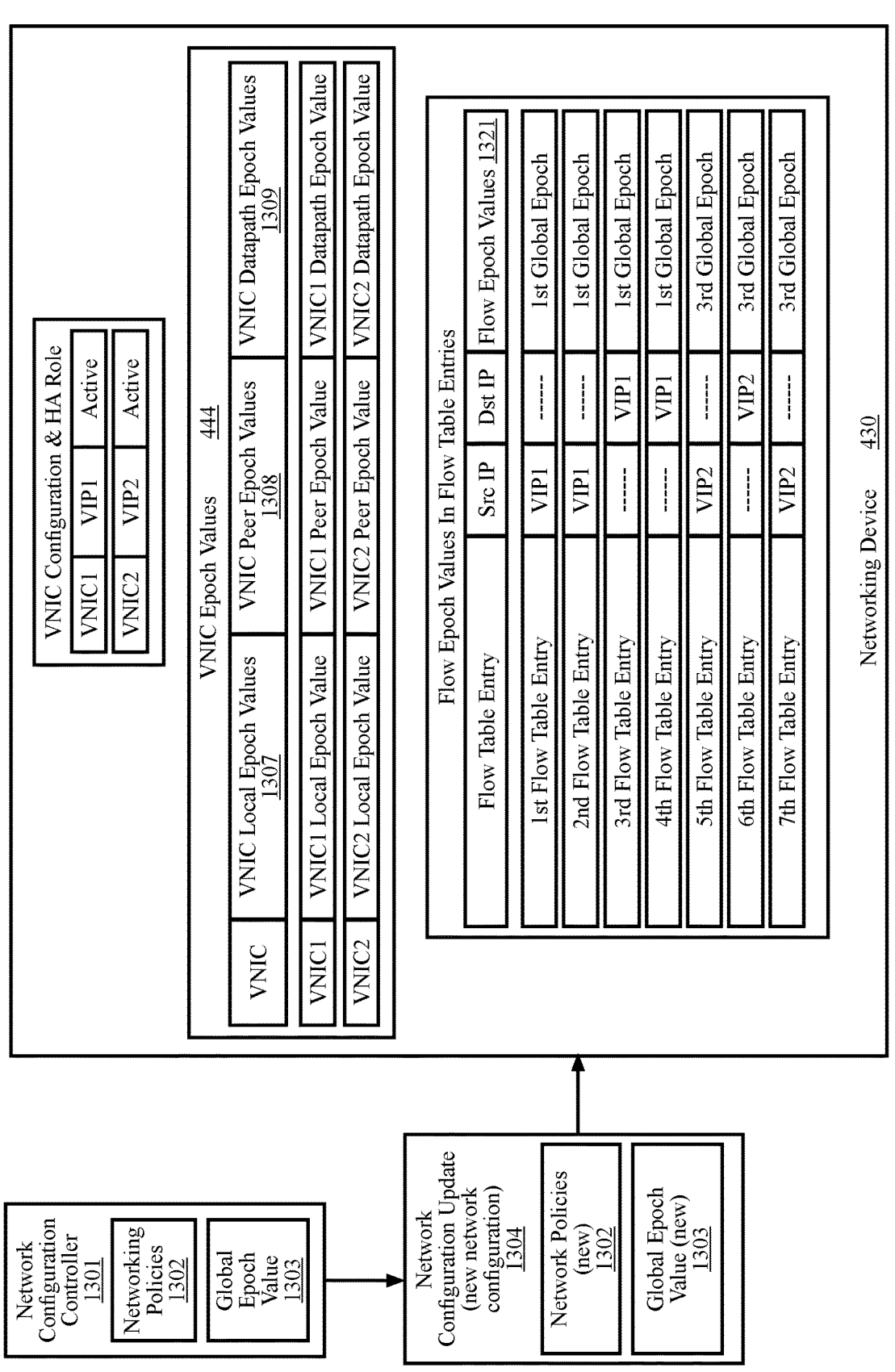
FIG. 13 is a high-level conceptual diagram illustrating a network configuration update provided to a networking device, according to some aspects.

FIG. 13 is a high-level conceptual diagram illustrating a network configuration update 1304 provided to a networking device 430, according to some aspects. Network configurations are often changed by administrators and users for a plethora of reasons. Those changes need to be propagated to the networking devices. A network configuration controller 1301 can be a host or VM that is tasked with maintaining the most recent network configuration and sending the most recent network configuration to the networking devices. The network configuration can include networking policies 1302 that the networking devices apply to network packets. The concept of a global epoch can be applied to the network configurations. Every new network configuration 1304 marks the beginning of a new global epoch. A global epoch value can identify a global epoch. For example, the global epoch value may be an integer (e.g., a version number) that is incremented every time the network configuration changes. Another example is that the global epoch value can be a timestamp that indicates a time at which the network configuration changes. The network configuration controller 1301 can store the global epoch value 1303. The networking device 430 can receive the new network configuration 1304 and use the global epoch value 1303 associated with (e.g., included in) the new network configuration to determine whether and how to update its own stored network configuration and flow table entries. For example, the networking device 430 may determine that the new network configuration is actually older than a previously received network configuration and therefore simply discard the new network configuration.

The networking device can store VNIC epoch values 444 for each VNIC. The VNIC epoch values 444 can include VNIC local epoch values 1307, VNIC peer epoch values 1308, and VNIC datapath epoch values 1309. FIG. 13 illustrates VNIC epoch values being stored for VNIC1 and VNIC2. The networking device 430 may set a VNIC local epoch value to equal a global epoch value that is associated with a network configuration. The networking device 430 may set a VNIC peer epoch value to the VNIC epoch value reported by a HA peer via a sync packet. The networking device 430 may update a VNIC datapath epoch value based on a VNIC local epoch value, a VNIC peer epoch value, and the current value of the VNIC datapath epoch value. The networking device 430 stores flow table entries in a flow table. Those flow table entries can include flow epoch values 1321. Various heuristics, described below, can use the VNIC epoch values 444 and the flow epoch values 1321 to ensure that HA peers in a HA configuration have consistent flow tables. By having consistent flow tables, the HA peers are ready to transition to the active role for a VIP at any time.

The flow epoch values 1321 are illustrated as indicating global epochs. For example, the first global epoch may have begun when version one of the network configuration was submitted to the network configuration controller 1301. The second global epoch may have begun when version two of the network configuration was submitted to the network configuration controller 1301. The third global epoch may have begun when the third version of the network configuration was submitted to the network configuration controller 1301. Each flow table entry may therefore have a flow epoch value that equals the global epoch value associated with the network configuration that was used to create the flow table entry. A new version of the network configuration may result in changes to only a small subset the flow tables entries. As such, the flow table entries may indicate different global epochs. FIG. 13 illustrates an example in which the flow table entries for VIP1 are associated with a first global epoch and the flow table entries for VIP2 are associated with a third global epoch.

FIG. 14 is a high-level flow diagram illustrating a process that helps determine whether a network configuration update changes a policy implemented for a VNIC 1400, according to some aspects. The VNIC local epoch value indicates the most recent network configuration that changed a policy implemented by the VNIC that is implemented on the networking device. As such, when a new network configuration changes a policy implemented for a VNIC, then the VNIC local epoch value can be set to equal the global epoch value associated with the new network configuration, as in the example illustrated in FIG. 14. After the start, at block 1401 the process receives a network configuration delta that indicates the networking policies that change when upgrading from the current network configuration to the new network configuration. The new network configuration is associated with a global epoch value. At block 1402, the process can determine the VNIC local epoch value for the VNIC. At decision block 1403 the process can compare the global epoch value to the VNIC local epoch value. The process moves to block 1404 if the global epoch value is greater than the VNIC local epoch value at decision block 1403. Otherwise, the process is done and the update will not be applied. At block 1404, the process sets current IP to the first IP associated with a VNIC. For example, FIG. 9 shows VIP1 associated with VNIC1. At block 1405, the process sets current policy to the first networking policy in the network configuration delta. At decision block 1406, the process determines whether the current policy affects the current IP. If the current policy affects the current IP at decision block 1406, the process moves to block 1407, otherwise, the process moves to decision block 1408. At block 1407, the process sets the VNIC local epoch value for the VNIC to equal the global epoch value before the process is done. At decision block 1408, the process determines whether the current policy is the last policy in the network configuration delta. If the current policy is the last policy in the network configuration delta, the process is done and the VNIC local epoch value is unchanged when the new network configuration does not change any policy that the networking device implements for the VNIC. Otherwise, the process moves to block 1409. At block 1409, the current policy is set to the next policy in the network configuration delta before the process loops back to decision block 1406.

A networking device has a peer device and the peer device can also have a VNIC local epoch value that is set by a process such as the process illustrated in FIG. 14. The VNIC local epoch value on the peer indicates the most recent network configuration that the peer device received that changed a policy implemented by the VNIC that is implemented on the peer device. The peer device can communicate its VNIC local epoch value to the networking device where it is stored as the peer VNIC epoch value. The peer VNIC epoch value can therefore indicate the most recent network configuration that the peer device received that changed a policy implemented for the VNIC on the peer device.

FIG. 15 is a high-level flow diagram illustrating a process that determines which VNICs are affected by a policy that is changed by a network configuration update, according to some aspects. After the start, at block 1501 the process receives a new network configuration. A new global epoch value is associated with or included in the new network configuration. At block 1502 the process reads the networking device's global epoch value. At decision block 1503, the process checks whether the new global epoch value is greater than the device's global epoch value. The process moves to block 1504 if the new global epoch value is greater than the device's global epoch value. Otherwise, the process is done when the networking device is already at the same or a more recent global epoch than the one associated with the new network configuration. At block 1504, the process produces a network configuration delta of policies that are changed by the new network configuration. The network configuration delta can be produced by comparing the current network configuration to the new network configuration and logging the differences between them. At block 1506, the process sets current VNIC to the first VNIC. At block 1507, the process can determine whether any policy implemented for the current VNIC is changed by network configuration delta. FIG. 14 illustrates an example of a process that block 1507 may use. At decision block 1508, the process checks the result of determining whether any policy implemented for the current VNIC is changed by network configuration delta. The process moves to block 1511 if any policy implemented for the current VNIC is changed by network configuration delta and otherwise moves to decision block 1509. At block 1511, the process marks the current VNIC as a VNIC that must be updated. For example, the current VNIC may be marked as needing to be updated by setting the VNIC local epoch value for the current VNIC to the new global epoch value. The HA peer may also be notified of the changed VNIC local epoch value for the current VNIC. At decision block 1509, the process determines if the current VNIC is the last VNIC. The process is done if the current VNIC is the last VNIC at decision block 1509, otherwise the process moves to block 1510. At block 1501, the process sets current VNIC to the next VNIC before looping back to block 1507.

FIG. 16 is a high-level flow diagram illustrating a process that conditionally updates a flow table entry based on a flow epoch value and a VNIC datapath epoch value 1600, according to some aspects. Much of the process illustrated in FIG. 16 is implemented by the packet processing pipeline circuit of the networking device. After the start, the process receives a network packet at block 1601. At block 1602, the parsing circuit of the packet processing pipeline circuit parses the packet to produce a PHV. At block 1603, the process uses the PHV to determine the flow table entry to use for processing the network packet. The flow table entry can include a flow epoch value and a VNIC indicator. For example, the flow table can be a key-value table and the packet 5-tuple can be used to produce a key. The flow table entry can be the value associated with the key in the flow table. At block 1604, the process can determine the VNIC datapath epoch value for the VNIC indicated by the VNIC indicator. At decision block 1605, the process can determine whether the flow epoch value is less than VNIC datapath epoch value. The process moves to block 1607 if the flow epoch value is less than VNIC datapath epoch value at decision block 1605, otherwise the process moves to block 1606. At block 1606, the process uses the current flow table entry to process the network packet in the packet processing pipeline circuit before the process is done. At block 1607, the network packet is sent to the control plane. In practice, sending the network packet to the control plane includes queuing the PHV on a control plane input queue. The process moves from the data plane to the control plane while moving from block 1607 to block 1608. At block 1608, the control plane uses the network configuration to produce a new flow table entry and updates the flow table entry in the flow table with the new flow table entry. At block 1609, the control plane may process the network packet or may send the network packet back to the data plane. For example, the control plane may place the PHV on a data plane input queue such that the packet processing pipeline circuit processes the network packet. The control plane, having determined the policies to apply to the network packet, may apply those policies to the network packet.

Figure 17:
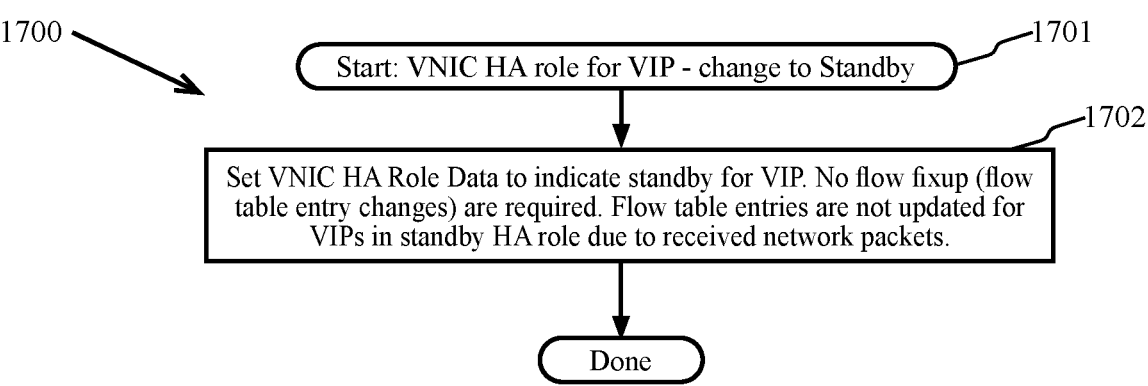
FIG. 17 is a high-level flow diagram illustrating a process that can be used for transitioning to a standby HA role, according to some aspects.

FIG. 17 is a high-level flow diagram illustrating a process that can be used for transitioning to a standby HA role 1700, according to some aspects. The process starts when the networking device is transitioning to the standby HA role for a VIP 1701. At block 1702, the process can set the VNIC HA role data to indicate standby for the VIP. Flow table entries are not updated for VIPs in the standby HA role due to received network packets. Therefore, no flow fixup (flow table entry changes) are required for this HA role transition. Furthermore, the networking device should not receive network packets for a VIP when it is in the standby role for that VIP.

Figure 18:
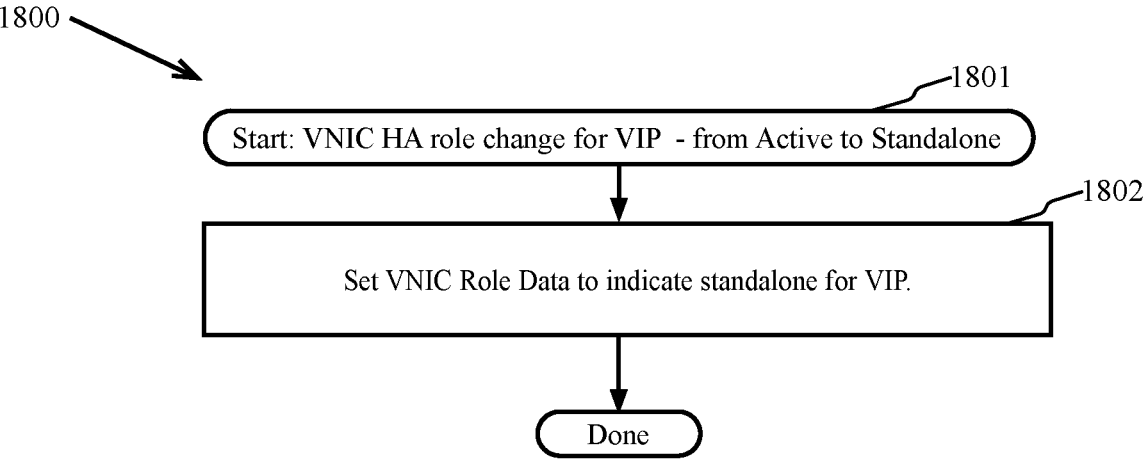
FIG. 18 is a high-level flow diagram illustrating a process that can be used for transitioning from an active HA role to a standalone HA role, according to some aspects.

FIG. 18 is a high-level flow diagram illustrating a process that can be used for transitioning from an active HA role to a standalone HA role 1800, according to some aspects. The process starts when the networking device is transitioning from the active HA role to the standalone role for a VIP 1801. At block 1802, the process can set the VNIC role data to indicate standalone for the VIP. Here, the networking device keeps processing network packets for the VIP, as before, but may not be sending sync packets for the VIP to the HA peer when in standalone for the VIP.

Figure 19:
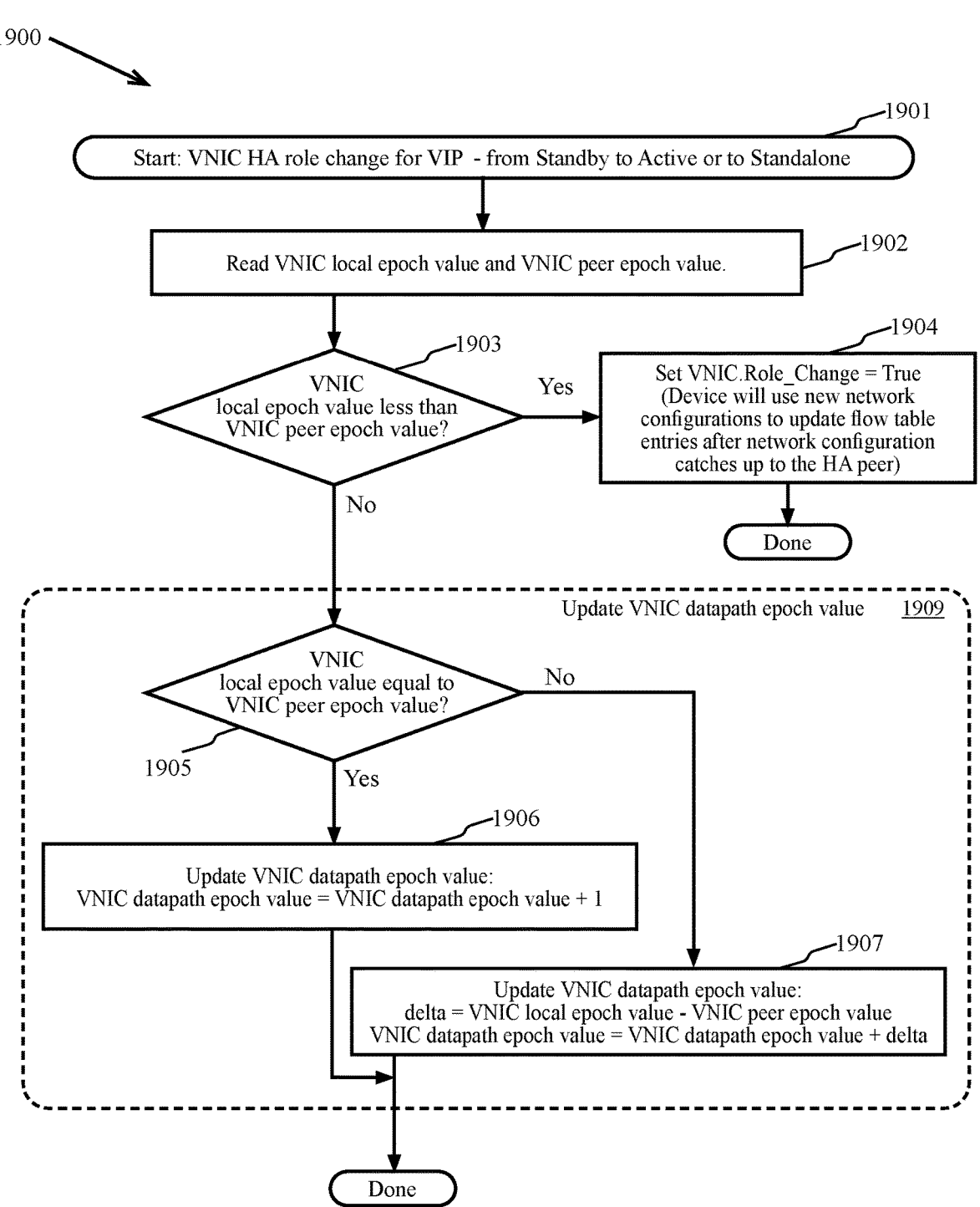
FIG. 19 is a high-level flow diagram illustrating a process that can be used for transitioning from a standby HA role to an active HA role or a standalone HA role, according to some aspects.

FIG. 19 is a high-level flow diagram illustrating a process that can be used for transitioning from a standby HA role to an active HA role or a standalone HA role 1900, according to some aspects. The process starts when the networking device is transitioning from the standby HA role to the active role or the standalone role for a VIP 1901. At block 1902, the process can read the VNIC local epoch value and the VNIC peer epoch value. At decision block 1903, the process can determine whether the VNIC local epoch value is less than the VNIC peer epoch value. The process moves to block 1904 if the VNIC local epoch value is less than the VNIC peer epoch value at decision block 1903 and otherwise moves to block 1909. In block 1909, the process updates the VNIC datapath epoch value before the process is done. At block 1904, the process can set the flag VNIC.Role_Change to true, indicating that the HA role change has been completed. The networking device will use new network configurations to update flow table entries after the network configuration catches up to the HA peer.

The process enters block 1909 by moving to decision block 1905. At decision block 1905, the process determines whether the VNIC local epoch value is equal to the VNIC peer epoch value. The process moves to block 1906 if the VNIC local epoch value is equal to the VNIC peer epoch value at decision block 1905 and otherwise moves to block 1907. At block 1906, the process updates the VNIC datapath epoch value by setting VNIC datapath epoch value=VNIC datapath epoch value+1. At block 1907, the process updates the VNIC datapath epoch value by setting VNIC datapath epoch value=VNIC datapath epoch value+delta, where delta=VNIC local epoch value-VNIC peer epoch value. "delta" is the difference between the VNIC local epoch value and the VNIC peer epoch value.

FIG. 20 is a high-level flow diagram illustrating a process that updates VNIC epoch values based on a new network configuration, according to some aspects. After the start, a new network configuration is received as block 2001. At decision block 2002, the process determines whether the network configuration changes any policy implemented for the VNIC. The process moves to decision block 2003 if the network configuration changes any policy implemented for the VNIC at decision block 2002, otherwise the process is done. At decision block 2003, the process determines whether the VNIC is in a HA configuration for the VIP. The process moves to decision block 2004 if the VNIC is in a HA configuration for the VIP at decision block 2003 and otherwise the process is done. At decision block 2004, the process determines whether the VNIC is in the HA standby role for the VIP. The process moves to block 2005 if the VNIC is in the HA standby role for the VIP at decision block 2004, otherwise the process moves to block 2007. At block 2005, the process sets the VNIC local epoch value equal to the new global epoch value. At block 2006, the process notifies the HA peer of the updated VNIC local epoch value before the process is done. For example, the HA peer can be notified by sending a sync packet that includes the VNIC local epoch value, now equal to the new global epoch value, to the HA peer. At block 2007, the process updates the VNIC datapath epoch value. Block 1909, illustrated in FIG. 19, provides details for updating the VNIC datapath epoch value. At decision block 2008, the process determines whether the HA role changed for the VIP. The process moves to block 2005 if the HA role changed for the VIP at decision block 2008, otherwise the process moves to decision block 2009. At decision block 2009, the process determines whether the new global epoch value is less than the VNIC peer epoch value. The process moves to block 2005 if the new global epoch value is less than the VNIC peer epoch value at decision block 2009, otherwise the process moves to decision block 2010. At decision block 2010, the process determines whether the HA role is standalone for the VIP. The process moves to block 2011 if the HA role is standalone for the VIP at decision block 2010, otherwise the process moves to block 2005. At block 2011, the process can invalidate the VNIC peer epoch value due to the peer being unreachable. The VNIC peer epoch value can be invalidated by setting it to a value that indicates it is invalid or by setting a flag that indicates it is invalid. A value that indicates the VNIC peer epoch value is invalid is the maximum possible value to which it can be set.

The VNIC datapath epoch value is a value that is computed from the VNIC local epoch value and the VNIC peer epoch value to indicate that a flow table entry is out of date and should be updated. For example, an out of date flow table entry may be a flow table entry that is no longer valid or relevant. The flow epoch value in a flow table entry can be set to the VNIC datapath epoch value when the flow table entry is updated. After the flow table entry is updated, the VNIC datapath epoch value may be increased to a value larger than the flow epoch value in the flow table entry. FIG. 19 and FIG. 20 illustrate situations, such as changing VNIC roles (FIG. 19) and receiving a network configuration update (FIG. 20) that may result in increasing the VNIC datapath epoch value. The flow table entry can be out of date when the flow epoch value stored in the flow table entry is less than the VNIC datapath epoch value. FIG. 16 illustrates a process that can detect and update an out of date flow table entry.

FIG. 21 is a high-level flow diagram illustrating a method for consistent configuration update handling in high availability deployments using a global configuration epoch, according to some aspects. At block 2101, a networking device can participate in a HA configuration that processes a plurality of network flows for a plurality of VNICs that includes a first VNIC. At block 2102, the process can store a flow table that includes a plurality of flow table entries that includes a first flow table entry that includes a first flow epoch value. At block 2103, the process can store a network configuration that is used to create the flow table entries and that is associated with a global epoch value. At block 2104, the process can store a first VNIC local epoch value that equals the global epoch value and that is associated with the first VNIC. At block 2105, the process can receive a first VNIC peer epoch value from a HA peer that is in the HA configuration. At block 2106, the process can use the first VNIC peer epoch value and the first VNIC local epoch value to set a first VNIC datapath epoch value. At block 2107, the networking device can receive a network packet that is an encapsulated network packet from the first VNIC. At block 2108, the packet processing pipeline circuit that is in the networking device can use the network packet to identify the first flow table entry. At block 2109, the process can determine that the first flow epoch value is less than the first VNIC datapath epoch value. At block 2110, the process can use the network configuration to update the first flow table entry when the first flow epoch value is less than the first VNIC datapath epoch value.

FIG. 22 is another high-level flow diagram illustrating a method for consistent configuration update handling in high availability deployments using a global configuration epoch, according to some aspects. After the start, at block 2201 the method can use, by a data plane, an encapsulated network packet received from a virtual network interface card (VNIC) to identify a flow table entry that includes a flow epoch value. At block 2202, the method can update, by a control plane, the flow table entry when the VNIC is pinned to a networking device and the flow epoch value is less than a VNIC datapath epoch value, wherein a packet processing pipeline circuit of the networking device is configured to implement the data plane, and a processor of the networking device is configured to implement the control plane.

Figure 23:
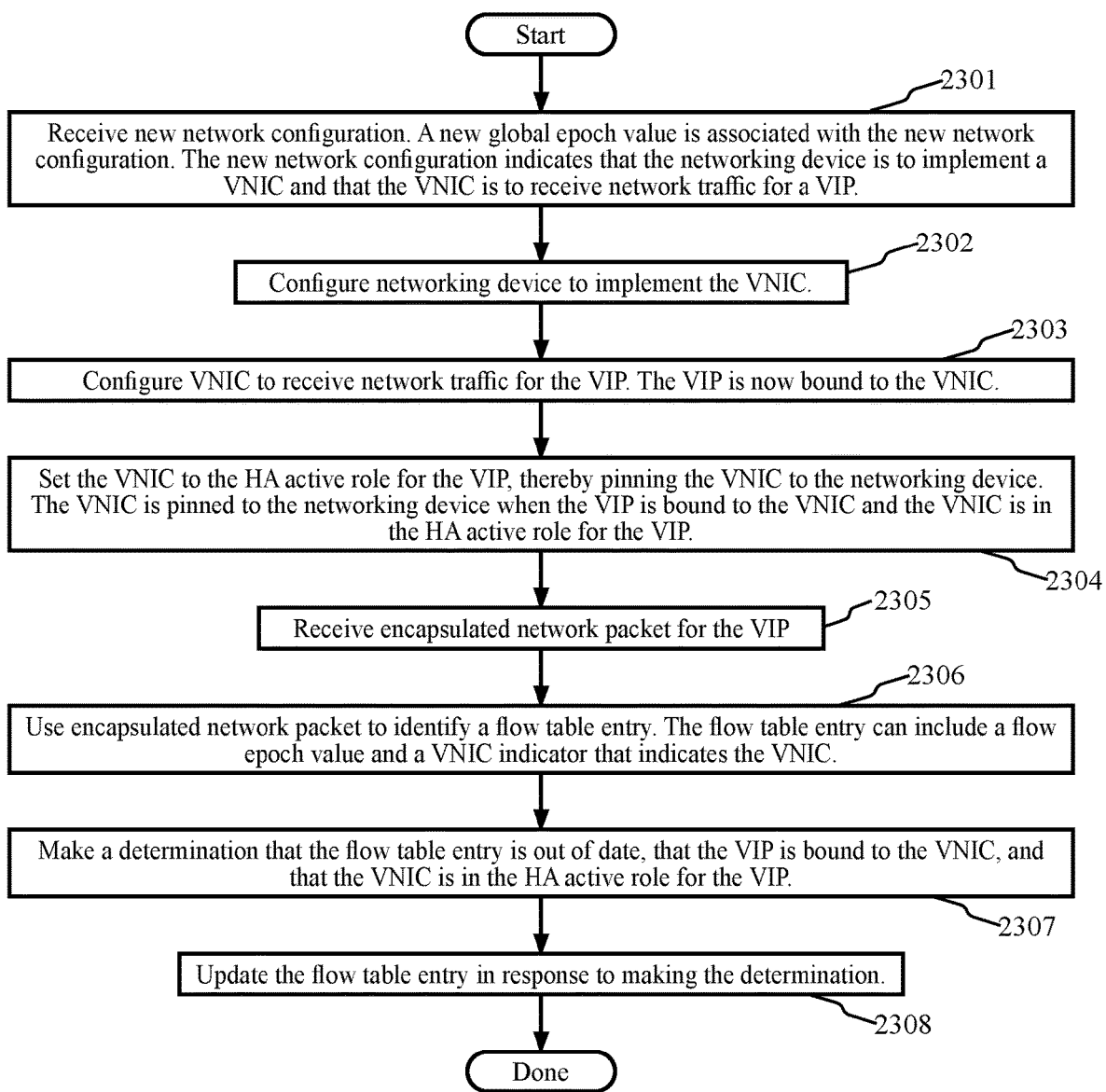
FIG. 23 is a high-level flow diagram illustrating a process that updates a flow table entry in response to making a determination that the flow table entry is out of date, that the VIP is bound to the VNIC, and that the VNIC is in the HA active role for the VIP, according to some aspects.

FIG. 23 is a high-level flow diagram illustrating a process that updates a flow table entry in response to making a determination that the flow table entry is out of date, that the VIP is bound to the VNIC, and that the VNIC is in the HA active role for the VIP, according to some aspects. After the start, at block 2301 the process can receive a new network configuration. A new global epoch value is associated with the new network configuration. The new network configuration indicates that the networking device is to implement a VNIC and that the VNIC is to receive network traffic for a VIP. At block 2302, the networking device is configured to implement the VNIC. At block 2303, the VNIC can be configured to receive network traffic for the VIP. The VIP is bound to the VNIC at block 2303. At block 2304, the process can set the VNIC to the HA active role for the VIP, thereby pinning the VNIC to the networking device. The VNIC is pinned to the networking device when the VIP is bound to the VNIC and the VNIC is in the HA active role for the VIP. The control plane may perform the operations shown in blocks 2301, 2302, 2302, and 2304. At block 2305, the process can receive an encapsulated network packet for the VIP. At block 2306, the process can use the encapsulated network packet to identify a flow table entry. The flow table entry can include a flow epoch value and a VNIC indicator that indicates the VNIC. The data plane may perform the operations shown in block 2305 and 2306. At block 2307, the process may make a determination has been made that the he flow table entry is out of date and that the VIP is bound to the VNIC and the VNIC is in the HA active role for the VIP. FIG. 24 illustrates a process that makes a determination that the flow table entry is out of date, that the VIP is bound to the VNIC, and the VNIC is in the HA active role for the VIP, according to some aspects. At block 2308, the process can update the flow table entry in response to making the determination. The control plane may perform the operation shown in block 2308.

FIG. 24 is a high-level flow diagram illustrating a process that makes a determination that the flow table entry is out of date, that the VIP is bound to the VNIC, and that the VNIC is in the HA active role for the VIP, according to some aspects. At block 2401, the process determines that the flow table entry is out of date. The flow table entry can include a flow epoch value and a VNIC identifier that indicates a VNIC. The flow table entry is out of date when the flow epoch value less than VNIC datapath epoch value. The data plane may perform the operation shown in block 2401. At block 2402, the process determines that a VIP is bound to the VNIC, and that the VNIC is in the HA active role for the VIP. Note: this is the same as determining that the VNIC is pinned to the networking device. A network packet received for the VIP may have been used to identify the VIP, the VIP is therefore known. The data plane or the control plane may perform the operation shown in block 2401. Due to the operation shown in block 2401 and in block 2402, the process has made a determination that the flow table entry is out of date, that the VIP is bound to the VNIC, and that the VNIC is in the HA active role for the VIP. If the flow table entry is not out of date at block 2401, then the process cannot perform the operation shown in block 2401 and the process may therefore abort or return an indication that the determination has not been made. If VIP is not bound to VNIC or the VNIC is not in the HA active role for the VIP at block 2402, then the process cannot perform the operation shown in block 2402 and the process may therefore abort or return an indication that the determination has not been made.

Aspects described above can be ultimately implemented in a networking device that includes physical circuits that implement digital data processing, storage, and communications. The networking device can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU and other semiconductor chip circuits are fabricated on the same semiconductor substrate to form a System-on-Chip (SoC). The networking device may be a single IC device (e.g., fabricated on a single substrate) or the networking device may be a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

What is claimed is:

1. A networking device comprising:
a packet processing pipeline circuit configured to implement a data plane; and
a processor configured to implement a control plane,
wherein the packet processing pipeline circuit and the processor are further configured to implement flow table updating, wherein the flow table updating includes:
the data plane using an encapsulated network packet received from a virtual network interface card (VNIC) to identify a flow table entry;
making a determination that the flow table entry is out of date, that a virtual internet protocol (VIP) address in the encapsulated network packet is bound to the VNIC, and that the VNIC is in a high availability (HA) active role for the VIP address; and
the control plane updating the flow table entry in response to a result of making the determination.

2. The networking device of claim 1, wherein:
a VNIC datapath epoch value is determined from a VNIC local epoch value and a VNIC peer epoch value that is the VNIC local epoch value of a HA peer; and
a flow epoch value stored in the flow table entry being less than the VNIC datapath epoch value indicates that the flow table entry is out of date.

3. The networking device of claim 2, wherein:
a network configuration received by the networking device is associated with a global epoch value; and
the networking device is configured to update the VNIC local epoch value to equal the global epoch value in response to determining that the network configuration changes a policy that is implemented for the VNIC and that the global epoch value is greater than the VNIC local epoch value.

4. The networking device of claim 3, wherein the control plane is configured to update the VNIC datapath epoch value after updating the VNIC local epoch in response to determining that the VNIC has the HA active role for the VIP address and the VIP address is bound to the VNIC.

5. The networking device of claim 4, wherein updating the VNIC datapath epoch value includes incrementing the VNIC datapath epoch value by one in response to determining that the VNIC peer epoch value equals the VNIC local epoch value.

6. The networking device of claim 4, wherein updating the VNIC datapath epoch value includes incrementing the VNIC datapath epoch value by a difference between the VNIC local epoch value and the VNIC peer epoch value in response to determining that the VNIC peer epoch value does not equal the VNIC local epoch value.

7. The networking device of claim 3, wherein the VNIC local epoch value is not updated in response to receiving the network configuration after determining that none of a plurality of policies that are implemented for the VNIC are changed by the network configuration.

8. The networking device of claim 3, wherein
a second VNIC local epoch value and a second VNIC datapath epoch value are associated with a second VNIC;
the networking device is configured to update the second VNIC local epoch value to equal the global epoch value in response to determining that the network configuration changing a second policy implemented for the second VNIC; and
the networking device is configured to update the second VNIC datapath epoch value in response to determining that the second VNIC has the HA active role for a second VIP address that is bound to the second VNIC.

9. The networking device of claim 3, wherein:
the networking device is configured to send a sync packet to the HA peer;
the sync packet includes a flow table update for the flow table entry; and
the flow epoch value included in the flow table update equals the global epoch value.

10. The networking device of claim 2, wherein the networking device is configured to send the VNIC local epoch value to the HA peer after updating the VNIC local epoch value.

11. The networking device of claim 2, wherein the VNIC peer epoch value does not equal the VNIC local epoch value.

12. The networking device of claim 2, wherein the VNIC local epoch value is less than a global epoch value associated with a HA configuration that includes the networking device and the HA peer.

13. The networking device of claim 2, wherein:
the networking device is configured to receive a sync packet for the flow table entry;
the sync packet includes a second flow epoch value of the flow table entry; and
the networking device is configured to use the sync packet to update the flow table entry in response to determining that the second flow epoch value is greater than the flow epoch value.

14. The networking device of claim 2, wherein the networking device is configured to transition to a standby role for the VNIC in response to the HA peer transitioning to an HA active role.

15. The networking device of claim 1, wherein:
the data plane is configured to determine that the flow table entry is out of date;
the control plane is configured to determine that the VIP address is bound to the VNIC; and
the control plane is configured to determine that the VNIC is in the HA active role for the VIP address.

16. A method comprising:
using, by a data plane, an encapsulated network packet received from a virtual network interface card (VNIC) to identify a flow table entry;
making a determination that the flow table entry is out of date, that a virtual internet protocol (VIP) address in the encapsulated network packet is bound to the VNIC, and that the VNIC is in a HA active role for the VIP address; and
updating, by a control plane, the flow table entry in response to a result of making the determination,
wherein:
a packet processing pipeline circuit of a networking device is configured to implement the data plane; and
a processor of the networking device is configured to implement the control plane.

17. The method of claim 16, wherein:
a VNIC datapath epoch value is determined from a VNIC local epoch value and a VNIC peer epoch value that is the VNIC local epoch value of a HA peer; and
updating the flow table entry includes setting a flow epoch value that is in the flow table entry to equal the VNIC datapath epoch value.

18. The method of claim 16, wherein:

a VNIC datapath epoch value is determined from a VNIC local epoch value and a VNIC peer epoch value that is the VNIC local epoch value of a HA peer; and a flow epoch value stored in the flow table entry being less than the VNIC datapath epoch value indicates that the flow table entry is out of date.

19. The method of claim 18, further including:

receiving a network configuration that is associated with a global epoch value; and setting the VNIC local epoch value to equal the global epoch value in response to determining that the network configuration changes a policy that is implemented for the VNIC and that the global epoch value is greater than the VNIC local epoch value.

20. The method of claim 19, further including:

using the VNIC local epoch value to update the VNIC datapath epoch value after updating the VNIC local epoch and after determining that the VNIC has the HA active role for the VIP address in the encapsulated network packet and that the VIP address is bound to the VNIC.

21. A networking device comprising:

a circuit means for implementing a data plane means;

a processor means for implementing a control plane means; and a determination means for making a determination that a flow table entry is out of date, that a virtual internet protocol (VIP) address is bound to a virtual network interface card (VNIC) implemented by the networking device, and that the VNIC is in a high availability (HA) active role for the VIP address, wherein:

the flow table entry is associated with the VIP address; and the control plane means is configured to update the flow table entry in response to a result of the determination means making the determination.

* * * * *